(12) United States Patent
Dietle et al.

(10) Patent No.: US 9,845,879 B2
(45) Date of Patent: Dec. 19, 2017

(54) HIGH PRESSURE DYNAMIC SEALING ARRANGEMENT

(71) Applicant: KALSI ENGINEERING INC., Sugar Land, TX (US)

(72) Inventors: Lannie Laroy Dietle, Houston, TX (US); Aaron Paul Ritchie, Houston, TX (US)

(73) Assignee: Kalsi Engineering, Inc., Sugar Land, TX (US)

( * ) Notice: Subject to any disclaimer, the term of this patent is extended or adjusted under 35 U.S.C. 154(b) by 0 days.

(21) Appl. No.: 15/240,823

(22) Filed: Aug. 18, 2016

(65) Prior Publication Data

US 2016/0356382 A1 Dec. 8, 2016

Related U.S. Application Data

(63) Continuation-in-part of application No. 14/052,553, filed on Oct. 11, 2013, now Pat. No. 9,429,238, which is a continuation-in-part of application No. 12/957,160, filed on Nov. 30, 2010, now Pat. No. 9,316,319, and a continuation-in-part of application No. 13/026,045, filed on Feb. 11, 2011, now Pat. No. 9,109,703.

(60) Provisional application No. 61/283,227, filed on Nov. 30, 2009, provisional application No. 61/284,179, filed on Dec. 14, 2009, provisional application No. 61/854,879, filed on May 3, 2013, provisional application No. 61/797,747, filed on Dec. 14, 2012, provisional application No. 61/795,217, filed on Oct.

(Continued)

(51) Int. Cl.
*F16J 9/00* (2006.01)
*F16J 15/16* (2006.01)
*F16L 27/08* (2006.01)
*E21B 17/05* (2006.01)

(52) U.S. Cl.
CPC ............ *F16J 15/166* (2013.01); *E21B 17/05* (2013.01); *F16L 27/0828* (2013.01)

(58) Field of Classification Search
CPC ...... F16J 15/164; F16J 15/166; F16J 15/3288; F16J 15/006; F16J 15/441–15/443; F16J 15/342; F16J 15/3404; F16J 15/3412; F16J 15/348; F16J 15/3228; F16L 27/0828; E21B 17/05
USPC ........ 277/300, 336, 306, 422, 401, 579, 503
See application file for complete search history.

(56) References Cited

U.S. PATENT DOCUMENTS

| 2,253,932 A | 8/1941 | Gilkerson |
| 2,394,800 A | 2/1946 | Murphy |

(Continued)

FOREIGN PATENT DOCUMENTS

| JP | 01-152151 U | 10/1989 |
| JP | 06-147327 A | 5/1994 |
| WO | 2008029786 A1 | 3/2008 |

*Primary Examiner* — Nathan Cumar
(74) *Attorney, Agent, or Firm* — Bracewell LLP; Douglas W. Rommelmann

(57) ABSTRACT

The invention is a sealing assembly for equipment with movable shafts—such as coaxial and side port swivels, hydraulic swivels, and rotary control devices—that prevents the loss of a high pressure fluid through the clearance existing between a housing and the shaft. The invention is disclosed in the context of a coaxial swivel that conducts high pressure fluid from a stationary first conduit to a rotating second conduit that has dynamic runout, and may be misaligned relative to the first conduit.

24 Claims, 11 Drawing Sheets

Related U.S. Application Data 12, 2012, provisional application No. 61/337,667, filed on Feb. 11, 2010, provisional application No. 62/284,814, filed on Oct. 9, 2015, provisional application No. 62/388,342, filed on Jan. 21, 2016, provisional application No. 62/389,204, filed on Feb. 19, 2016.

(56) References Cited

U.S. PATENT DOCUMENTS

| | | |
|---|---|---|
| 2,442,687 A | 6/1948 | Heathcott |
| 2,459,472 A | 1/1949 | Tremolada |
| 2,520,306 A | 8/1950 | Detweiler |
| 2,608,385 A | 8/1952 | Stahl |
| 2,706,655 A | 4/1955 | Showalter |
| 2,728,620 A | 12/1955 | Krueger |
| 2,934,368 A | 4/1960 | Adamson |
| 2,998,288 A | 4/1961 | Newhouse |
| 3,271,039 A | 9/1966 | Kohl |
| 3,305,241 A | 2/1967 | Hart |
| 3,497,225 A | 2/1970 | Workman |
| 3,544,118 A | 12/1970 | Klein |
| 3,575,424 A | 4/1971 | Taschenberg |
| 3,627,337 A | 12/1971 | Pippert |
| 3,730,284 A | 5/1973 | Striegler |
| 3,801,114 A | 4/1974 | Bentley |
| 3,848,880 A | 11/1974 | Tanner |
| 3,868,105 A | 2/1975 | Bentley |
| 3,887,198 A | 6/1975 | McClure et al. |
| 3,921,987 A | 11/1975 | Johnston et al. |
| 3,923,315 A | 12/1975 | Hadaway |
| 3,929,340 A | 12/1975 | Peisker |
| 3,970,321 A | 7/1976 | Dechavanne |
| 3,973,781 A | 8/1976 | Groich |
| 3,984,113 A | 10/1976 | Bentley |
| 4,084,826 A | 4/1978 | Vossieck et al. |
| 4,094,519 A | 6/1978 | Heyn et al. |
| 4,118,856 A | 10/1978 | Bainard et al. |
| 4,183,543 A | 1/1980 | Antonini |
| 4,240,676 A | 12/1980 | Anderson et al. |
| 4,288,083 A | 9/1981 | Braconier |
| 4,336,945 A | 6/1982 | Christiansen et al. |
| 4,387,902 A | 6/1983 | Conover |
| 4,421,425 A | 12/1983 | Faucher et al. |
| 4,440,405 A | 4/1984 | Schaus et al. |
| 4,441,722 A | 4/1984 | Pichler |
| 4,451,050 A | 5/1984 | Repella |
| 4,484,753 A | 11/1984 | Kalsi |
| 4,496,251 A | 1/1985 | Ide |
| 4,501,431 A | 2/1985 | Peisker et al. |
| 4,515,486 A | 5/1985 | Ide |
| 4,542,573 A | 9/1985 | Bainard |
| 4,602,806 A | 7/1986 | Saliger |
| 4,610,319 A | 9/1986 | Kalsi |
| 4,619,534 A | 10/1986 | Daly |
| 4,671,519 A | 6/1987 | Bras |
| 4,676,668 A | 6/1987 | Ide |
| 4,695,063 A | 9/1987 | Schmitt et al. |
| 4,705,277 A | 11/1987 | Repella |
| 4,717,160 A | 1/1988 | Zitting et al. |
| 4,726,695 A | 2/1988 | Showalter |
| 4,729,569 A | 3/1988 | Muller et al. |
| 4,739,998 A | 4/1988 | Steusloff et al. |
| 4,750,747 A | 6/1988 | Holzer |
| 4,770,548 A | 9/1988 | Otto |
| 4,783,086 A | 11/1988 | Bras et al. |
| 4,789,166 A | 12/1988 | Rericha et al. |
| 4,848,774 A | 7/1989 | Nyilas et al. |
| 5,002,289 A | 3/1991 | Yasui et al. |
| 5,024,364 A | 6/1991 | Nash |
| 5,046,906 A | 9/1991 | Bucknell |
| 5,054,938 A | 10/1991 | Ide |
| 5,066,144 A | 11/1991 | Ide |
| 5,102,236 A | 4/1992 | Ide |
| 5,112,143 A | 5/1992 | Ide |
| 5,137,373 A | 8/1992 | Ide |
| 5,139,275 A | 8/1992 | Ehrmann et al. |
| 5,172,921 A | 12/1992 | Stenlund |
| 5,178,215 A | 1/1993 | Yenulis |
| 5,188,462 A | 2/1993 | Hooper et al. |
| 5,190,299 A | 3/1993 | Johnston |
| 5,195,754 A | 3/1993 | Dietle |
| 5,195,757 A | 3/1993 | Dahll |
| 5,199,514 A | 4/1993 | Titus |
| 5,222,815 A | 6/1993 | Ide |
| 5,224,557 A | 7/1993 | Yenulis et al. |
| 5,230,520 A | 7/1993 | Dietle et al. |
| 5,265,964 A | 11/1993 | Hooper |
| 5,279,365 A | 1/1994 | Yenulis et al. |
| 5,284,392 A | 2/1994 | Ide |
| 5,306,021 A | 4/1994 | Morvant |
| 5,372,431 A | 12/1994 | Ide |
| 5,427,387 A | 6/1995 | Johnston |
| 5,489,155 A | 2/1996 | Ide |
| 5,503,479 A | 4/1996 | Ide |
| 5,511,886 A | 4/1996 | Sink |
| 5,513,917 A | 5/1996 | Ide et al. |
| 5,527,045 A | 6/1996 | Pondelick |
| 5,558,444 A | 9/1996 | Ide |
| 5,588,491 A | 12/1996 | Brugman et al. |
| 5,593,231 A | 1/1997 | Ippolito |
| 5,647,444 A | 7/1997 | Williams |
| 5,662,171 A | 9/1997 | Brugman et al. |
| 5,662,181 A | 9/1997 | Williams |
| 5,662,335 A | 9/1997 | Larsen |
| 5,664,888 A | 9/1997 | Sabin |
| 5,678,829 A | 10/1997 | Kalsi et al. |
| 5,692,757 A | 12/1997 | Straub |
| 5,711,534 A | 1/1998 | Bengoa et al. |
| 5,738,358 A | 4/1998 | Kals et al. |
| 5,791,658 A | 8/1998 | Johnston |
| 5,823,541 A | 10/1998 | Dietle et al. |
| 5,829,338 A | 11/1998 | Chrestoff et al. |
| 5,873,576 A | 2/1999 | Dietle et al. |
| 5,915,696 A | 6/1999 | Onuma et al. |
| 5,921,555 A | 7/1999 | Johnston |
| 5,938,344 A | 8/1999 | Sabin |
| 6,007,105 A | 12/1999 | Dietle et al. |
| 6,016,880 A | 1/2000 | Hall et al. |
| 6,036,192 A | 3/2000 | Dietle et al. |
| 6,105,968 A | 8/2000 | Yeh et al. |
| 6,109,618 A | 8/2000 | Dietle |
| 6,120,036 A | 9/2000 | Kalsi et al. |
| 6,139,020 A | 10/2000 | Friend et al. |
| 6,182,750 B1 * | 2/2001 | Edwards ............... E21B 17/05 166/55.1 |
| 6,189,896 B1 | 2/2001 | Dickey et al. |
| 6,227,547 B1 * | 5/2001 | Dietle ............... E21B 4/003 277/336 |
| 6,315,302 B1 | 11/2001 | Conroy et al. |
| 6,334,619 B1 | 1/2002 | Dietle et al. |
| 6,354,374 B1 * | 3/2002 | Edwards ............... E21B 17/05 166/297 |
| 6,371,488 B1 | 4/2002 | Szymborski et al. |
| 6,382,634 B1 | 5/2002 | Dietle et al. |
| 6,416,225 B1 | 7/2002 | Cioceanu et al. |
| 6,460,635 B1 | 10/2002 | Kalsi et al. |
| 6,467,774 B1 | 10/2002 | Amaral et al. |
| 6,481,720 B1 | 11/2002 | Yoshida et al. |
| 6,494,462 B2 | 12/2002 | Dietle |
| 6,554,016 B2 | 4/2003 | Kinder |
| 6,561,520 B2 | 5/2003 | Kalsi et al. |
| 6,619,664 B1 | 9/2003 | Metz |
| 6,685,194 B2 | 2/2004 | Dietle et al. |
| 6,688,603 B2 | 2/2004 | vom Schemm |
| 6,749,172 B2 | 6/2004 | Kinder |
| 6,767,016 B2 | 7/2004 | Gobeli et al. |
| 7,004,444 B2 | 2/2006 | Kinder |
| 7,007,913 B2 | 3/2006 | Kinder |
| 7,052,020 B2 | 5/2006 | Gobeli et al. |
| 7,341,258 B2 * | 3/2008 | Holt ............... F16J 15/166 277/584 |
| 7,562,878 B2 | 7/2009 | Dietle et al. |
| 7,770,898 B2 | 8/2010 | Dietle et al. |

(56) References Cited

U.S. PATENT DOCUMENTS

| | | |
|---|---|---|
| 7,798,496 B2 | 9/2010 | Dietle et al. |
| 7,934,545 B2 | 5/2011 | Bailey et al. |
| 8,083,235 B2 | 12/2011 | Azibert et al. |
| 8,282,107 B2 | 10/2012 | Horiba et al. |
| 2001/0024016 A1 | 9/2001 | Gobeli et al. |
| 2003/0205864 A1 | 11/2003 | Dietle et al. |
| 2005/0156386 A1 | 7/2005 | Ota et al. |
| 2006/0171616 A1 | 8/2006 | Richie et al. |
| 2006/0214379 A1 | 9/2006 | James et al. |
| 2007/0013143 A1 | 1/2007 | Schroeder et al. |
| 2007/0160314 A1 | 7/2007 | Richie et al. |
| 2009/0001671 A1 | 1/2009 | Dietle et al. |
| 2010/0259015 A1 | 10/2010 | Dietle |
| 2010/0264603 A1 | 10/2010 | Schroeder et al. |
| 2011/0127725 A1 | 6/2011 | Dietle et al. |
| 2012/0038113 A1* | 2/2012 | Dietle .................. F16J 15/166 277/301 |

\* cited by examiner

HIGH PRESSURE DYNAMIC SEALING ARRANGEMENT

CROSS REFERENCE TO RELATED APPLICATIONS

This application is a continuation-in-part application of U.S. application Ser. No. 14/052,553, filed Oct. 11, 2013, entitled "Dynamic Backup Ring Assembly" and claims the benefit of U.S. application Ser. No. 14/052,553. Applicant incorporates by reference herein application Ser. No. 14/052,553 in its entirety. U.S. application Ser. No. 14/052,553 claims the benefit of U.S. Provisional Application Ser. No. 61/795,217 filed Oct. 12, 2012, entitled "Force Balanced Backup Ring for Sealing Assembly," and claims the benefit of U.S. Provisional Application Ser. No. 61/797,747 filed Dec. 14, 2012, entitled "Floating, Axially and Radially Force Balanced Seal Carrier," and claims the benefit of U.S. Provisional Application Ser. No. 61/854,879 filed May 3, 2013, entitled "Modular Swivel Assembly." U.S. application Ser. No. 14/052,553 is a continuation-in-part application of U.S. application Ser. No. 12/957,160, filed Nov. 30, 2010, entitled "Pressure-Balanced Floating Seal Housing Assembly and Method" which claims the benefit of U.S. Provisional Application Ser. No. 61/283,227 filed Nov. 30, 2009, entitled "Seal Carrier," and claims the benefit of U.S. Provisional application Ser. No. 61/284,179 filed Dec. 14, 2009, entitled "Pressure-Balanced Floating Seal Carrier." U.S. application Ser. No. 14/052,553 is a continuation-in-part application of U.S. application Ser. No. 13/026,045, filed Feb. 11, 2011, entitled "Hydrodynamic Backup Ring" which claims the benefit of U.S. Provisional Application Ser. No. 61/337,667 filed Feb. 11, 2010 and entitled "High Pressure Rotary Seal."

This application claims the benefit of U.S. Provisional Application Ser. No. 62/284,814 filed on Oct. 9, 2015 by Lannie Laroy Dietle and Aaron Paul Richie and entitled "Self-contained high pressure washpipe assembly." Applicant incorporates by reference herein Application Ser. No. 62/284,814 in its entirety.

This application claims the benefit of U.S. Provisional Application Ser. No. 62/388,342 filed on Jan. 21, 2016 by Lannie Laroy Dietle and Aaron Paul Richie and entitled "Self-contained high pressure washpipe assembly." Applicant incorporates by reference herein Application Ser. No. 62/388,342 in its entirety.

This application claims the benefit of U.S. Provisional Application Ser. No. 62/389,204 filed on Feb. 19, 2016 by Lannie Laroy Dietle and Aaron Paul Richie and entitled "Self-contained high pressure washpipe assembly." Applicant incorporates by reference herein Application Ser. No. 62/389,204 in its entirety.

BACKGROUND OF THE INVENTION

1. Field of the Invention

The present invention is related to machinery having a relatively movable shaft, where a pressure-retaining seal establishes sealing contact with the relatively movable shaft to retain a pressurized first fluid and partition the first fluid from a second fluid having lower pressure. Examples of relatively movable shafts include shafts that have relative rotation with respect to the pressure-retaining seal, shafts that have relative reciprocation with respect to the pressure-retaining seal, and shafts that have both rotation and reciprocation relative to the pressure-retaining seal.

More specifically, the present invention is related to a sealing assembly that applies the pressures of the first and second fluids to controlled locations on a backup ring in order to provide relative immunity to pressure-induced diametric dimensional changes, and in order to provide opposed axially acting hydraulic forces that substantially balance one another, allowing the backup ring to align itself on the shaft and to follow lateral deflection and runout of the shaft. These benefits allow the backup ring to define a small initial extrusion gap for the pressure-retaining seal, minimizing pressure-induced extrusion damage to the pressure-retaining seal.

2. Description of the Prior Art

U.S. Pat. No. 5,195,754, entitled "Laterally Translating Seal Carrier for a Drilling Mud Motor Sealed Bearing Assembly," and U.S. Pat. No. 6,227,547, entitled "High Pressure Rotary Shaft Sealing Mechanism" disclose axially force balanced seal carriers that follow the often unavoidable lateral motion of rotary shafts while maintaining a relatively small extrusion gap clearance between the seal carrier and the rotary shaft. The seal carriers of these patents require a step change in shaft diameter, and therefore cannot accommodate the significant shaft reciprocation found in some types of rotary equipment, such as the rotating control devices shown in U.S. Pat. Nos. 5,588,491 and 5,662,171. Another limitation with the seal carriers of U.S. Pat. Nos. 5,195,754 and 6,227,547 is that seals and seal carriers of different diameters are typically required for pressure staging.

The seal carriers of U.S. Pat. Nos. 5,195,754 and 6,227,547 are subject to the coning problem that is shown in FIG. 3 of Chapter D16 Rev. 0 (Apr. 23, 2012) of the Kalsi Seals Handbook, Rev. 6. Chapter D16 is titled "Axially force balanced, laterally translating arrangements," and describes the problem as follows: "The portion of a laterally translating high pressure seal carrier that is located between the Kalsi-brand seal and the face seal experiences a radial pressure imbalance that causes an inward deflection of the seal carrier. This deflection has to be taken into account when designing the journal bearing fit, the extrusion gap fit, and the axial fit of the seal carrier with the surrounding support structure." The problem with merely taking the deflection into account when designing the extrusion gap fit is that the extrusion gap closes as differential pressure builds, trapping extruded sealing material.

U.S. Pat. No. 6,007,105, entitled "Swivel Seal Assembly" provides pressure staging across a plurality of rotary seals engaging a relatively rotatable washpipe, and provides for simultaneous articulation of the washpipe and a surrounding seal housing to accommodate shaft run-out and misalignment. This simultaneous articulation is made possible by axial pressure balancing of both the washpipe and the seal housing. Because the seal housing expands due to internal pressure, the extrusion gap clearance changes as the sealed fluid pressure increases. Higher differential pressures could be withstood if the extrusion gap clearance could be held more constant.

SUMMARY OF THE INVENTION

The invention is a sealing assembly for equipment with a movable shaft element—such as coaxial and side port swivels, hydraulic swivels, and rotary control devices—that prevents the loss of a fluid through clearance surrounding the shaft element.

Although appropriate for a variety of equipment having a movable shaft element, the invention is disclosed herein in the context of a sealing assembly for a coaxial swivel assembly that conducts a fluid media from a stationary first conduit to a rotating second conduit that may have dynamic runout, and may be misaligned relative to the first conduit. The shaft element is illustrated as being attached to the second conduit, but as a simplification, the shaft element could be integral with the second conduit.

An open end of the first conduit of the swivel assembly faces, and is generally coaxially aligned with, an open end of the second conduit. The relative rotation between the conduits is achieved by rotating the second conduit of the swivel assembly, which is guided by bearings residing in a bearing housing. The first conduit is mounted on a frame that is attached to the bearing housing. In some swivel assemblies, the shaft element is axially moveable with respect to the first conduit.

If desired, the sealing assembly may be retained to the first conduit by a retaining collar that is threadedly retained to the first conduit and has a U-shaped slot that engages a radially projecting rim of the sealing assembly.

The sealing assembly includes a backup ring of generally circular form that mounts a pressure-retaining seal of annular form and preferably includes a seal carrier that mounts a partitioning seal. Preferably, a fluid reservoir of any suitable type, such as an annular piston guided by and sealed with respect to a piston guide and located within a machine housing, applies the pressure of the fluid media to a first fluid that is preferably conducted to a sealed region between the pressure-retaining seal and the partitioning seal. The first fluid is preferably a liquid-type seal lubricant having a pressure that may be referred to herein as the first fluid pressure. The partitioning seal preferably partitions the fluid media from the first fluid, and the pressure-retaining seal retains the pressure of the first fluid, and partitions the first fluid from a second fluid that typically has a much lower pressure than the fluid media and the first fluid. The second fluid may be any fluid, including but not limited to the atmosphere of the earth or a lubricant. The second fluid has a pressure that may be referred to herein as the second fluid pressure. The backup ring is preferably configured so that neither differential pressure acting across the pressure-retaining seal, nor the pressure of the second fluid, causes the backup ring to significantly change diameter.

The backup ring is located (i.e. positioned) axially by the generally axially facing locating shoulder of a bulkhead housing and the generally axially facing retaining shoulder of a ring retainer, at least a portion of the backup ring being located between the retaining shoulder of the ring retainer and the locating shoulder of the bulkhead housing. The backup ring is sealed with respect to the locating shoulder and the retaining shoulder. The retaining shoulder and the locating shoulder face generally toward one another. The seal carrier is preferably located axially by the retaining surface of a carrier retainer and a recess shoulder of the ring retainer, and is sealed with respect to the retaining surface of the carrier retainer. The bulkhead housing, the ring retainer, and the carrier retainer are preferably threadedly secured (i.e. retained) together, and may be threadedly secured to the machine housing. The carrier retainer is preferably sealed with respect to the ring retainer, and may be sealed with respect to the machine housing. The bulkhead housing has a portion thereof exposed to the first fluid and the first fluid pressure and has a portion thereof exposed to the second fluid and the second fluid pressure. The bulkhead housing is of annular form, and preferably includes a shaft passageway of annular form that faces generally radially inward, the shaft passageway preferably being the innermost surface of the bulkhead housing.

The backup ring has a ring inner surface facing generally inward. The shaft element has an externally oriented sealing surface of generally cylindrical form that is smaller than the ring inner surface of the backup ring that is described below, and at least part of the sealing surface is located within and encircled by the ring inner surface of the backup ring, and forms a region of clearance therewith, the ring inner surface establishing journal bearing relationship with the sealing surface, and the sealing surface locating the backup ring laterally (i.e. the sealing surface locating the backup ring radially). The ring inner surface is larger than, and faces generally radially inward toward, the sealing surface of the shaft element.

At least part of the sealing surface is located within and encircled by the annular extension of the backup ring that is described below. At least part of the shaft element is preferably located within and encircled by the shaft passageway of the bulkhead housing. The shaft element is relatively movable with respect to the bulkhead housing. The shaft element has a portion thereof exposed to the first fluid and a portion thereof exposed to the second fluid.

The ring retainer is preferably of annular form and is preferably located radially outward of and encircles at least a portion of the sealing surface of the shaft element.

The seal carrier and the backup ring are laterally translatable, and are guided laterally by journal bearing relationships with a sealing surface of the shaft element. The sealing surface is preferably sealingly engaged by both the partitioning seal and the pressure-retaining seal. During movement of the shaft element, the seal carrier, the backup ring, the partitioning seal, and the pressure-retaining seal preferably slip with respect to the sealing surface of the shaft element.

An outer first ring end of the backup ring faces in a generally axial direction toward and adjoins the retaining shoulder of the ring retainer, and faces away from the locating shoulder of the backup ring, and is sealed with respect to the retaining shoulder by a ring first end seal of preferably face-sealing configuration. The ring first end seal contacts and provides sealing between the ring retainer and the backup ring, partitioning the first fluid and the first fluid pressure from the second fluid and the second fluid pressure, and preventing the first fluid from escaping between the retaining shoulder and the outer first ring end and into the second fluid.

At least a portion of a second ring end of the backup ring faces and adjoins the locating shoulder of the bulkhead housing, and is sealed with respect to the locating shoulder by inner and outer balancing seals of face-sealing configuration. The outer first ring end and the second ring end face in generally opposite directions.

The inner and outer balancing seals are located radially outward of and encircle the shaft element, and are exposed to and located between the first and second fluids, and contact both the bulkhead housing and the backup ring, and provide sealing between the backup ring and the bulkhead housing, partitioning the first fluid and the first fluid pressure from the second fluid and the second fluid pressure, and preventing the first fluid from escaping between the locating shoulder and the second ring end and into the second fluid.

An annular extension extends axially from the backup ring, creating at least part of a radially inwardly facing gland bore of preferably annular form, within which preferably resides at least part of the pressure-retaining seal, which is preferably compressed axially between the gland bore and the sealing surface of the shaft element. One end of the gland bore preferably extends to a location intermediate to the outer first ring end and the second ring end, terminating at a gland inside corner that is an intersection between the gland bore and an inner first ring end of preferably planar form that faces in the same general axial direction as the outer first ring end, and faces in an axial direction generally opposite from and away from the second ring end. The other end of the gland bore preferably terminates at a seal installation chamfer of generally conical form, the installation chamfer axially being more distant from the inner first ring end, compared to the gland bore. At least a portion and preferably all of the inner first ring end is preferably located in intermediate relation to the outer first ring end and the second ring end.

The difference in pressure between one fluid and another, such as between the first fluid and the second fluid, is referred to as differential pressure or pressure differential. The inner first ring end supports the pressure-retaining seal against differential pressure that may be present between the first fluid and the second fluid, when the pressure of the first fluid is greater than the pressure of the second fluid.

The annular extension is located in radially intermediate relation to the inner first ring end and the outer first ring end. The pressure-retaining seal is located at least partially within the gland bore of the backup ring.

Between the inner first ring end and the second ring end, the backup ring preferably forms a radially inwardly facing ring inner surface that faces toward and forms a journal bearing type fit with the radially outwardly facing, generally cylindrical sealing surface of the shaft element. An intersection is preferably present between the ring inner surface and the inner first ring end forming an extrusion gap corner, and the clearance between the ring inner surface and the sealing surface of the shaft element forms an extrusion gap at the extrusion gap corner, and between the extrusion gap corner and the sealing surface of the shaft element. The pressure-retaining seal bridges this extrusion gap, and is exposed to the pressure of the second fluid at the extrusion gap.

The backup ring has a ring outer surface that is located in axially intermediate location to the outer first ring end and the second ring end, and is located in axially intermediate relation to the retaining shoulder and the locating shoulder. The ring outer surface of the backup ring is located radially outward of and encircles at least a portion of the ring inner surface The ring outer surface faces in a generally radially outwardly direction, away from the sealing surface of the shaft element. The ring inner surface and the ring outer surface are exposed to the pressure of the second fluid. The pressure of the second fluid can be communicated to the ring outer surface by a variety of means, such as an unsealed interface between the bulkhead housing and the ring retainer, or a pressure communication hole that passes in a generally radial direction through the bulkhead housing, or a communication hole that passes in a generally radial direction through the backup ring, communicating the second fluid pressure from the clearance between the ring inner surface and the sealing surface to the ring outer surface.

The pressure-retaining seal and the ring first end seal establish and define a first hydraulic area that is exposed to acted on by the pressure of the first fluid, producing an axially oriented first hydraulic force acting on the backup ring in a first hydraulic force direction generally toward the locating shoulder of the bulkhead housing.

The inner and outer balancing seals establish and define a second hydraulic area that is exposed to and acted on by the pressure of the first fluid, producing a second axially acting hydraulic force acting on the on the backup ring in a second hydraulic force direction, generally toward the retaining shoulder of the ring retainer and away from the locating shoulder of the bulkhead housing, the first and second axial hydraulic force directions being opposite to one another. The first and second axially acting hydraulic forces are preferably substantially equal, substantially freeing the backup ring from axially-acting hydraulic force imbalance that would create friction that would inhibit lateral motion of the backup ring and leaving the backup ring free to move laterally to accommodate any misalignment and dynamic runout of the sealing surface of the shaft element. The first fluid pressure can be transmitted to the second hydraulic area by any suitable fluid communication passageway.

The second hydraulic area is located farther from the sealing surface of the shaft element, compared to the first hydraulic area, which means that the first and second axially acting forces are radially misaligned. This radial misalignment tends to twist the backup ring torsionally, and tends to cause the ring inner surface to become slightly conical in service, even though the ring inner surface is preferably cylindrical in its relaxed, unstressed state. This coning effect related to the radial offset of the oppositely acting hydraulic forces is addressed by having the axial distance between the inner first ring end and the second ring end be less than the axial distance between the outer first ring end and the second ring end, so that some of the pressure of the first fluid acts through the material of the pressure-retaining seal in a radially outward direction on the backup ring, providing a certain amount of countervailing torsion to the backup ring. This arrangement can also be used to help to counteract any radial force imbalance resulting from the second fluid pressure acting on both the ring outer surface and the ring inner surface the backup ring, the ring outer surface typically having more pressure-exposed area, as compared to the ring inner surface.

The annular extension of the backup ring preferably incorporates the seal installation chamfer, and the gland bore of the backup ring is preferably located in axially intermediate location to the seal installation chamfer and the inner first ring end. The seal installation chamfer preferably forms an external corner with, and adjoins, the gland bore of the backup ring.

The gland bore has first and second axial extremities, and the retaining shoulder and the outer first ring end are preferably located axially in intermediate location to the first and second axial extremities of the gland bore.

A fluid communication passageway in the form of a hole is preferably formed in and passes through the backup ring, communicating from the outer first ring end to the second ring end. The fluid communication passageway is preferably located in radially intermediate relation to the pressure-retaining seal and the ring first end seal and is preferably located in radially intermediate relation to the inner and outer balancing seals, and is preferably located in radially intermediate relation to the annular extension and the ring first end seal, and communicates the pressure of the first fluid to a sealed region between the inner and outer balancing seals.

Preferably, the fluid communication passageway has a first open end facing in a generally axial direction away from the second ring end, and has a second open end facing in a generally axial direction away from the outer first ring end, the first open end being located in radially intermediate relation to the pressure-retaining seal and the ring first end seal, and the second open end being located in radially intermediate relation to the inner and outer balancing seals, the fluid communication passageway communicating the first fluid pressure through the backup ring from the outer first ring end to the second ring end, and to the second hydraulic area; i.e. the fluid communication passageway provides the first fluid pressure to the second hydraulic area.

An intersection between the inner first ring end and the ring inner surface of the backup ring forms the aforementioned extrusion gap corner, the outer first ring end being separated from the second ring end by an axial distance, and the extrusion gap corner being separated from the second ring end by an axial distance, the axial distance separating the extrusion gap corner from the second ring end preferably being less than the axial distance separating the outer first ring end and the second ring end, and the extrusion gap corner preferably being located in intermediate relation to the outer first ring end and second ring end, the extrusion gap corner being an external corner.

An intersection between the inner first ring end and the gland bore of the backup ring forms the aforementioned gland inside corner, the gland inside corner being separated from the second ring end by an axial distance, the axial distance separating the gland inside corner from the second ring end preferably being less than the axial distance separating the outer first ring end from the second ring end, and the gland inside corner preferably being located in axially intermediate relation to the outer first ring end and second ring end.

The pressure-retaining seal preferably has first and second seal ends, the first seal end facing generally away from the inner first ring end of the backup ring, and the second end facing generally toward and adjoining the inner first ring end, and the outer first ring end of the backup ring is preferably located in intermediate relation to the first and second seal ends, and the outer first ring end of the backup ring preferably encircles at least a portion of the gland bore and is preferably located radially outward of and encircles at least a portion of the sealing surface of the shaft element.

The pressure-retaining seal is in sealing contact with the backup ring and with the sealing surface of the shaft element and is preferably in sealing contact with the gland bore of the backup ring. The pressure-retaining seal partitions the first fluid from the second fluid, at least a portion of the gland bore encircling a part of the sealing surface.

As mentioned briefly above, the sealing assembly may include an axially movable piston that is located at least partially within a housing bore of a machine housing, a portion of the housing bore and a portion of the piston being exposed to the fluid media and a portion of the housing bore and a portion of the piston being exposed to the first fluid, a sliding seal located between and exposed to the fluid media and the first fluid and held in sealing contact with the housing bore and the piston, the piston separating the first fluid from the fluid media, and the fluid media pressure acting in a generally axial direction on the piston, producing the first fluid pressure.

The aforementioned annular extension protrudes axially from the backup ring at a location that is radially intermediate to the outer first ring end and the ring inner surface, a surface of the annular extension forming at least part of the gland bore, which faces generally radially inward toward, encircling, and separated radially from the sealing surface of the shaft element, at least a portion of the annular extension preferably being located within and encircled by an annular receiving recess of the ring retainer and at least part of the annular extension preferably being located within and encircled by the retaining shoulder, the annular extension being at a location radially inward of the outer first ring end and closer to the sealing surface of the shaft element, compared to the first ring end. The annular extension is also located in radially intermediate location to the inner first ring end and the outer first ring end. The annular receiving recess of the ring retainer is a generally radially inward facing feature. The annular receiving recess of the ring retainer is located in radially spaced relation to the sealing surface and preferably encircles at least part of the sealing surface.

The inner first ring end of the backup ring is located in radially intermediate relation to the annular extension and the sealing surface of the shaft element and is located radially outward of and encircling a portion of the sealing surface, and at least a portion and preferably all of the inner first ring end is located in axially intermediate location to the outer first ring end and the second ring end, the inner first ring end facing in a generally axial direction away from the second ring end.

The backup ring preferably has a modulus of elasticity that is greater than the modulus of elasticity of the material of the pressure-retaining seal. The preferred material for construction of the majority of the backup ring is metal, and preferably is a high modulus metal such as steel.

The backup ring of the present invention is suitable for use with both compression-type (i.e., interference-type) and flexing, lip-type pressure-retaining seals. A compression-type pressure-retaining seal is maintained in direct compression against the sealing surface in order to establish sealing contact force with the sealing surface. The flexing lip-type seals include a flexible dynamic lip that contacts the sealing surface, and sealing contact force is established by flexure of the dynamic lip, which can be assisted by energizing elements such as a spring or a compressed rubber element.

The axial distance between the retaining shoulder and the locating shoulder is slightly greater than the axial distance between the outer first ring end and the second ring end so that the backup ring is not pinched (i.e., clamped) between the retaining shoulder and the locating shoulder, leaving the backup ring free to move laterally in concert with any lateral motion of the shaft element.

In some cases, the axial forces acting on the backup ring may include other axially acting forces in addition to the aforementioned hydraulic forces. For example, in a vertical shaft application, the weight of the backup ring acts in an axial direction. For another example, the compressive force of the inner and outer balancing seals and the ring first end seal act in axial directions. Such forces are relatively negligible, and only the hydraulic forces typically need to be taken into account. Whether one is only balancing the axial hydraulic forces, or also balancing other axial forces such as, but not limited to, backup ring weight and seal compressive force, such balancing can be accomplished in the present invention by proper sizing of the first and second hydraulic areas. In some cases, it may be desirable to design in a slight hydraulic imbalance to eliminate or reduce any axial clearance between the second ring end and the locating shoulder. All of these slight hydraulic imbalances are intended to fall within the scope of what is meant by a condition of substantial axial force balance, or substantial axial pressure balance. Additionally, the slight but unintentional axial force imbalances that may occur as the result of design tolerances fall within the meaning of the description of the first and second axially-acting hydraulic forces being substantially equal.

The pressure-retaining seal and other seals that are used with the backup ring of the present invention may, if desired, incorporate one or more seal materials without departing from the spirit or scope of the invention, and may be composed of any suitable sealing material or materials, including elastomeric or rubber-like materials which may, if desired, be combined with various, plastic materials such as reinforced polytetrafluoroethylene ("PTFE") based plastic. If desired, the seals may be of monolithic integral, one piece construction or may also incorporate different materials bonded, co-vulcanized, or otherwise joined together to form a composite structure. Different materials may also be simply layered together radially or axially to create an effective seal. For example, prior art T-seals are composed of a ring of elastomer that is compressed against the surface to be sealed, and one or more mating rings of plastic to provide reinforcement at the extrusion gap. For another example, cap seals include an O-ring that compresses a plastic ring against the surface to be sealed, thereby presenting the plastic to the extrusion gap.

The pressure-retaining seal is preferably a hydrodynamic seal that exploits relative motion to lubricate the interface between the pressure-retaining seal and the sealing surface of the shaft element. This hydrodynamic action is accomplished by having the pressure-retaining seal provide at least one surface that converges gently with the relatively movable sealing surface of the shaft element, so that the gentle convergence forms a hydrodynamic inlet for wedging the first fluid into the interface as a result of at least one direction of relative axial or rotational motion. In seals adapted for hydrodynamic lubrication in response to both relative rotation and one direction of relative axial motion, the gentle convergence may occur at a wavy flank of the seal that faces the first fluid. As a result of the wavy flank, the interface between the pressure-retaining seal and the sealing surface, which is sometimes called a "footprint," has a wavy edge facing the first fluid, which is preferably a lubricant.

BRIEF DESCRIPTION OF THE DRAWINGS

So that the features, advantages, and objects of the present invention are attained and can be understood in detail, a comprehensive description of the invention may be had by reference to the embodiments thereof which are illustrated in the appended drawings. It is to be noted, however, that the appended drawings only illustrate typical embodiments of this invention, and are therefore not to be considered limiting of its scope.

DETAILED DESCRIPTION OF THE INVENTION

Introduction

All figures herein pertain to the same sealing assembly.

FIG. 1

Figure 1:
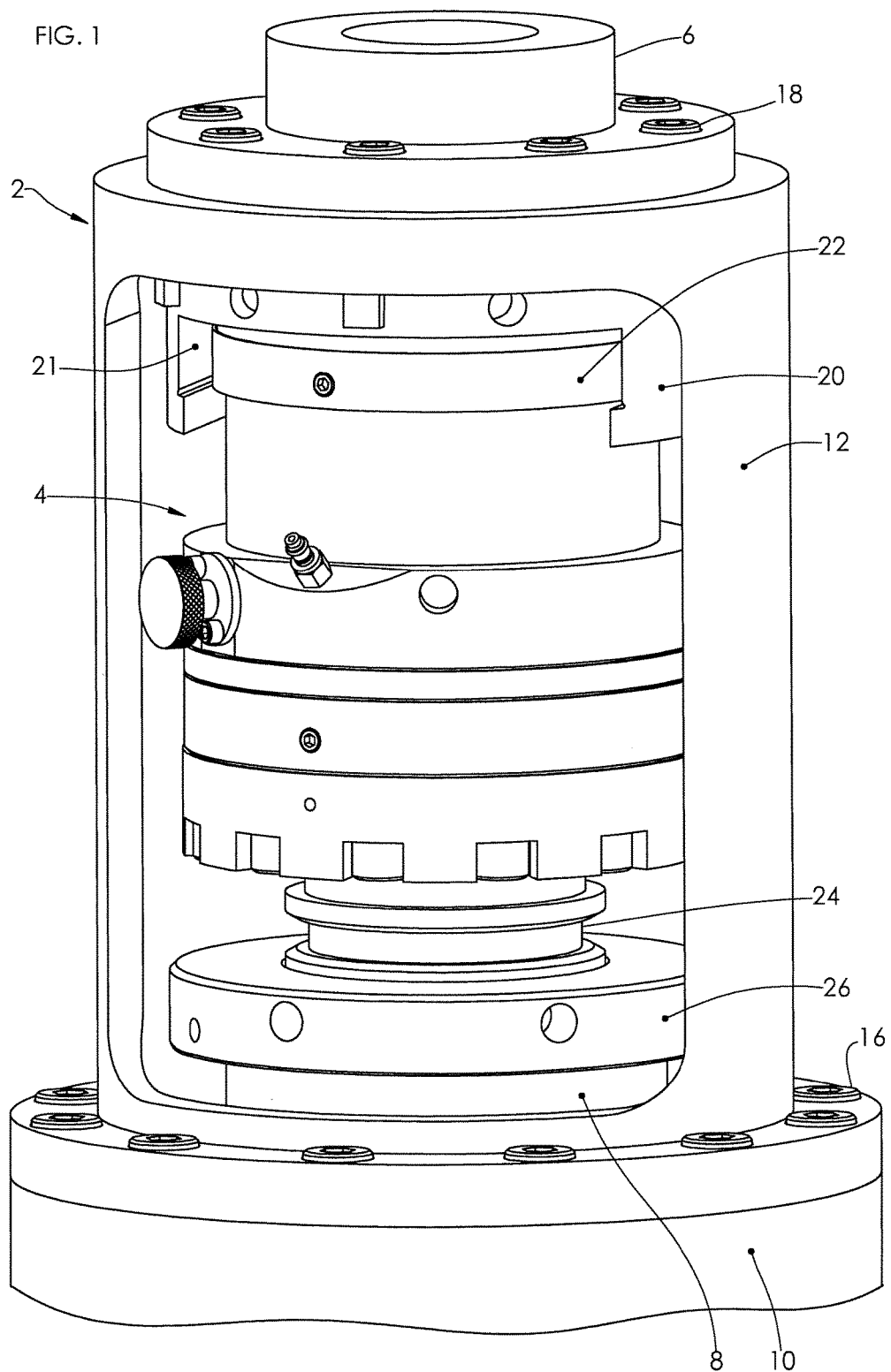
FIG. 1 is a fragmentary view of a swivel assembly that incorporates a sealing assembly representative of a preferred embodiment of the present invention.

FIG. 1 is a fragmentary view of a swivel assembly shown generally at 2 that incorporates a sealing assembly generally at 4. The swivel assembly 2 incorporates first and second conduits 6 and 8, and preferably incorporates a bearing housing 10, and a conduit support frame 12. In a swivel apparatus, the sealing assembly 4 is typically referred to as a washpipe assembly. Although the invention is disclosed herein in the context of the washpipe assembly of a swivel, the key elements of the invention are applicable to and can be incorporated in many other types of equipment, such as but not limited to oilfield rotary control devices (RCDs), pumps, machine tools, rock drilling machines, oilfield cementing heads, hydraulic swivels, and side port (also known as side entry) swivels. Simply put, the key elements of the invention are applicable to any device with a relatively movable shaft within a housing that requires one or more dynamic seals to retain a high pressure fluid, and prevent the high pressure fluid from escaping through clearance between the housing and the relatively movable shaft.

In a rotating control device of the general type shown in U.S. Pat. Nos. 5,588,491 and 5,662,171, the shaft is capable of both rotational and reciprocating motion relative to the pressure-retaining seal, which makes such a rotating control device an example of where the sealing assembly of the present invention can be advantageously used.

The conduit support frame 12 is typically attached to the bearing housing 10 by any suitable means, such as the frame bolts 16. It should be understood that, if desired, the conduit support frame 12 can simply be manufactured as an integral portion of the bearing housing 10.

The first conduit 6 is typically attached to the support frame 12 by any suitable means, such as the conduit bolts 18. It should be understood that, if desired, the first conduit 6 can simply be manufactured as an integral portion of the conduit support frame 12.

The second conduit 8 is preferably supported and guided for rotation by one or more bearings that are preferably within the bearing housing 10, but are not shown in FIG. 1. During operation, the second conduit 8 may have relative motion with respect to the bearing housing 10, the conduit support frame 12, and the first conduit 6, for example the second conduit 8 may rotate and/or reciprocate with respect to the bearing housing 10, the conduit support frame 12, and the first conduit 6.

Preferably, a non-rotating portion of the sealing assembly 4 is retained to the first conduit 6 by any suitable means, such as the illustrated first retaining collar 20, which may be slotted as shown, such that a slot 21 receives and retains a rim 22 of the sealing assembly 4.

Other suitable means are known in the art for securing a portion of a washpipe assembly to the first conduit of a swivel. For example, in U.S. Pat. No. 2,394,800, the housing portion (16) of the washpipe assembly is integral to the first conduit (9), and is flanged to the upper side of the conduit support frame and secured to the conduit support frame by bolts. For another example, in U.S. Pat. No. 2,459,472 the housing portion of the washpipe assembly is retained within a recess of the conduit support frame by a flange of the first conduit. For another example, in U.S. Pat. No. 2,608,385, the housing portion (40) of the washpipe assembly threads onto the lower end of the first conduit (26).

Preferably, a portion of the sealing assembly 4—the shaft element 24—is secured to the second conduit 8 by any suitable means, such as the illustrated second retaining collar 26, and preferably the shaft element 24 has a sealed relationship with the second conduit 8. The first and second retaining collars 20 and 26 may also be considered as components of the sealing assembly 4. In the washpipe assemblies of oilfield swivels, the shaft element 24 is commonly referred to as a washpipe. In other types of equipment, the shaft element 24 is typically referred to as a shaft or a mandrel. If desired, as a design choice, the shaft element 24 can be integral with the second conduit 8.

FIG. 2

Figure 2:
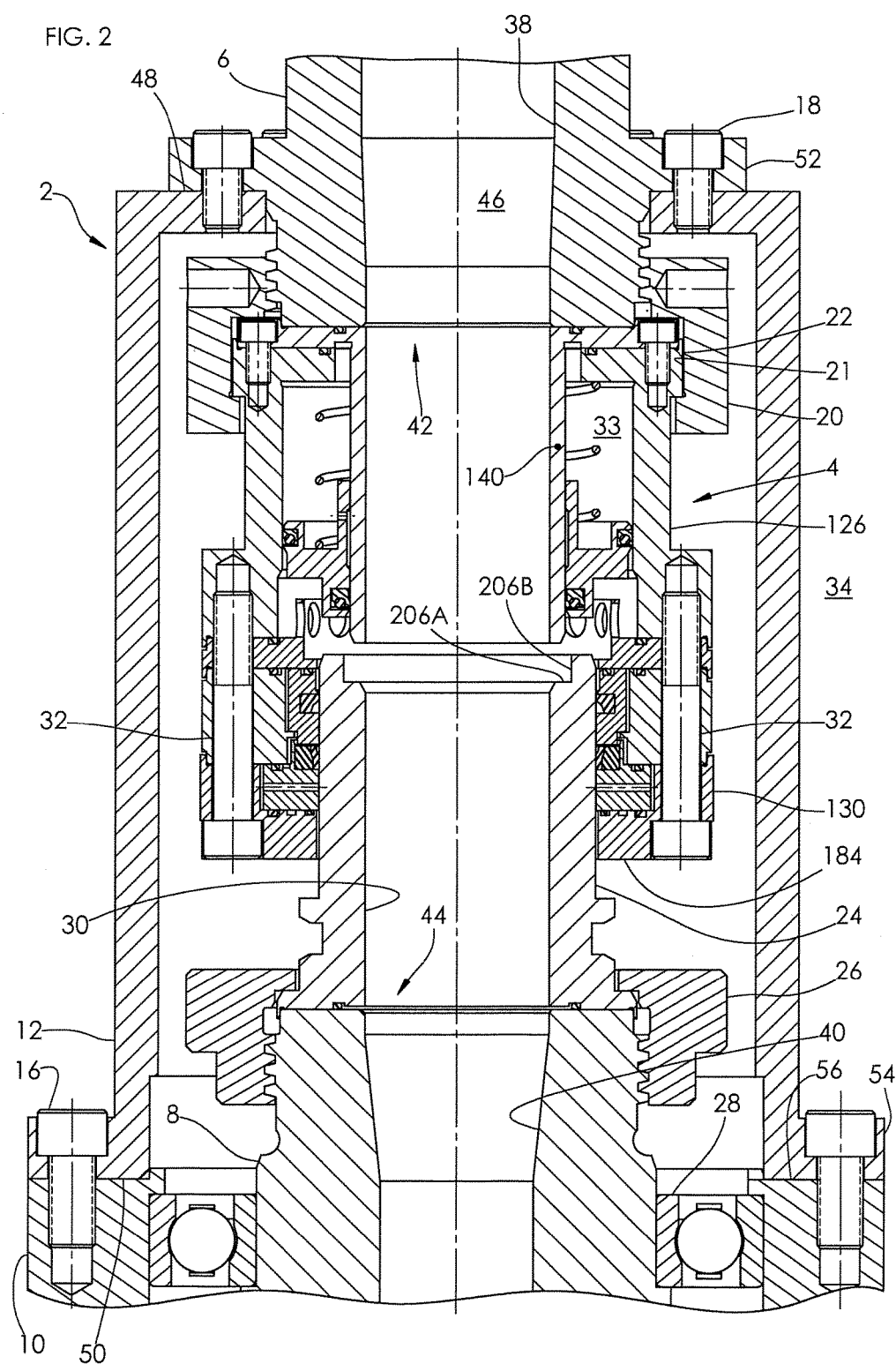
FIG. 2 is a fragmentary longitudinal cross-sectional view of the same swivel assembly that is shown in FIG. 1.

FIG. 2 is a fragmentary longitudinal cross-sectional view of the same swivel assembly 2 that is shown in FIG. 1, including the sealing assembly 4. By the term "longitudinal cross-sectional view," what is meant throughout this specification is the imaginary cutting plane of the cross-sectional view is aligned with and passes through the theoretical axis of the shaft element 24. The term "axis" is well-understood in mechanical engineering, and in the field of drafting is sometimes illustrated using a centerline in longitudinal cross-sectional views, as has been done in FIG. 2.

As described previously, the swivel assembly 2 incorporates first and second conduits 6 and 8, and preferably incorporates a bearing housing 10, and a conduit support frame 12. The conduit support frame 12 is typically attached to the bearing housing 10 by any suitable means, such as the frame bolts 16 that are illustrated. The first conduit 6 is typically attached to the conduit support frame 12 by any suitable means, such as the conduit bolts 18 that are illustrated.

The second conduit 8 is preferably supported, and guided for rotation by at least one bearing 28, and preferably by a plurality of bearings that are not shown. The at least one bearing 28 is preferably located within the bearing housing 10, as shown. During operation, the second conduit 8 may rotate relative to the bearing housing 10, the conduit support frame 12, and the first conduit 6. The sealing assembly 4 preferably contains a first fluid 33, and at least a part of the sealing assembly 4 is preferably exposed to a second fluid 34.

The first and second conduits 6 and 8 are preferably hollow, having passageways 38 and 40, respectively. The passageway 38 preferably forms an open end 42 in the first conduit 6, and the passageway 40 preferably forms an open end 44 of the second conduit 8. The open end 42 of passageway 38 faces generally toward the open end 44 of the passageway 40, and is preferably spaced apart from the open end 44, and is generally coaxially aligned with the second open end 44. The purpose of the swivel assembly 2 is to conduct a fluid media 46 through the passageways 38 and 40, and from one of the passageways 38 and 40 to the other of the passageways 38 and 40, and to prevent the leakage of the fluid media 46 into the first fluid 33 and into the second fluid 34. In other words, the sealing assembly 4 conducts the fluid media 46 between the first and second conduits 6 and 8. The shaft element 24 incorporates a shaft bore 30 that accommodates the flow of the fluid media 46 between the first and second conduits 6 and 8. In an oilfield swivel, the fluid media 46 is typically drilling fluid, which is also referred to drilling mud.

The first and second conduits 6 and 8 are axially spaced apart from one another by a distance. The first and second conduits 6 and 8 are intended to be generally coaxially aligned with one another, but due to manufacturing and assembly realities, the first and second conduits 6 and 8 typically have some amount of lateral and angular misalignment with respect to one another. The second conduit 8 typically has runout during rotation, due to factors such as bearing internal and mounting clearance, and machining eccentricities.

Swivel assemblies are used in many different industries. In the oil and gas industry, the first conduit 6 is typically referred to as a gooseneck, the second conduit 8 is sometimes referred to as a spindle or a mandrel, and the conduit support frame 12 is sometimes referred to as a gooseneck support. In the oil and gas industry, the second conduit 8 may be connected to a hollow drillstring (not shown), the swivel assembly 2 allows or causes the drillstring to rotate, and the fluid media 46 is the abrasive drilling fluid that is conducted from the first conduit 6, through the sealing assembly 4, to and through the second conduit 8, and through the drillstring to the bottom of the well. In the oil and gas industry, the type of swivel assembly that causes the drillstring to rotate incorporates a motor (not shown) that produces the rotation, and is referred to as a top drive or a power swivel.

The conduit support frame 12 preferably has oppositely facing, generally planar first and second ends 48 and 50. The first conduit 6 preferably has a bolt flange 52 that is secured to the first end 48 of the conduit support frame 12 by the conduit bolts 18. The conduit support frame 12 preferably has a bolt flange 54 that is preferably secured to a mounting surface 56 of the bearing housing 10 with frame bolts 16. In the oil and gas industry, the first end 48 of the conduit support frame 12 faces upward, the second end 50 faces downward, and the first conduit 6 is located above the second conduit 8.

The first retaining collar 20, shaft element 24, and second retaining collar 26 are preferably considered to be part of the sealing assembly 4. As can be seen in FIG. 2, several components of the sealing assembly 4 are preferably threadedly retained. Although other methods are possible, the preferred method is a pattern of bolts 32.

It can be appreciated that, as a simplification, the shaft element 24 could, in certain circumstances, be an integral part of the second conduit 8, rather than being separable from the second conduit 8.

A bulkhead end surface 184 of a bulkhead housing 130 preferably faces in a generally axial direction toward the second retaining collar 26 and away from a machine housing 126.

Preferably, the shaft element 24 incorporates a guide recess that includes a generally planar guide recess surface 206A and a generally cylindrical guide recess surface 206B, so that an end of a piston guide 140 can enter and be telescoped within the guide recess to allow the sealing assembly 4 to temporarily be made to be axially shorter during the process of assembly between the first conduit 6 and the second conduit 8. The generally planar guide recess surface 206A faces in an axial direction, toward the piston guide 140, and after the sealing assembly 4 is installed, the generally planar guide recess surface 206A is axially spaced from the piston guide 140.

Preferably, the second conduit 8, the second retaining collar 26, and the shaft element 24 are movable, such as rotationally and/or axially movable, relative to the first conduit 6, the first retaining collar 20, the machine housing 126, the bulkhead housing 130, and the piston guide 140, and movable relative to a piston 128 and a ring retainer 134.

The second conduit 8, the second retaining collar 26, and the shaft element 24 may have lateral misalignment and lateral motion (such as dynamic runout) relative to the first conduit 6, the first retaining collar 20, the machine housing 126, the piston 128, the bulkhead housing 130, the ring retainer 134, and the piston guide 140.

FIG. 3

Figure 3:
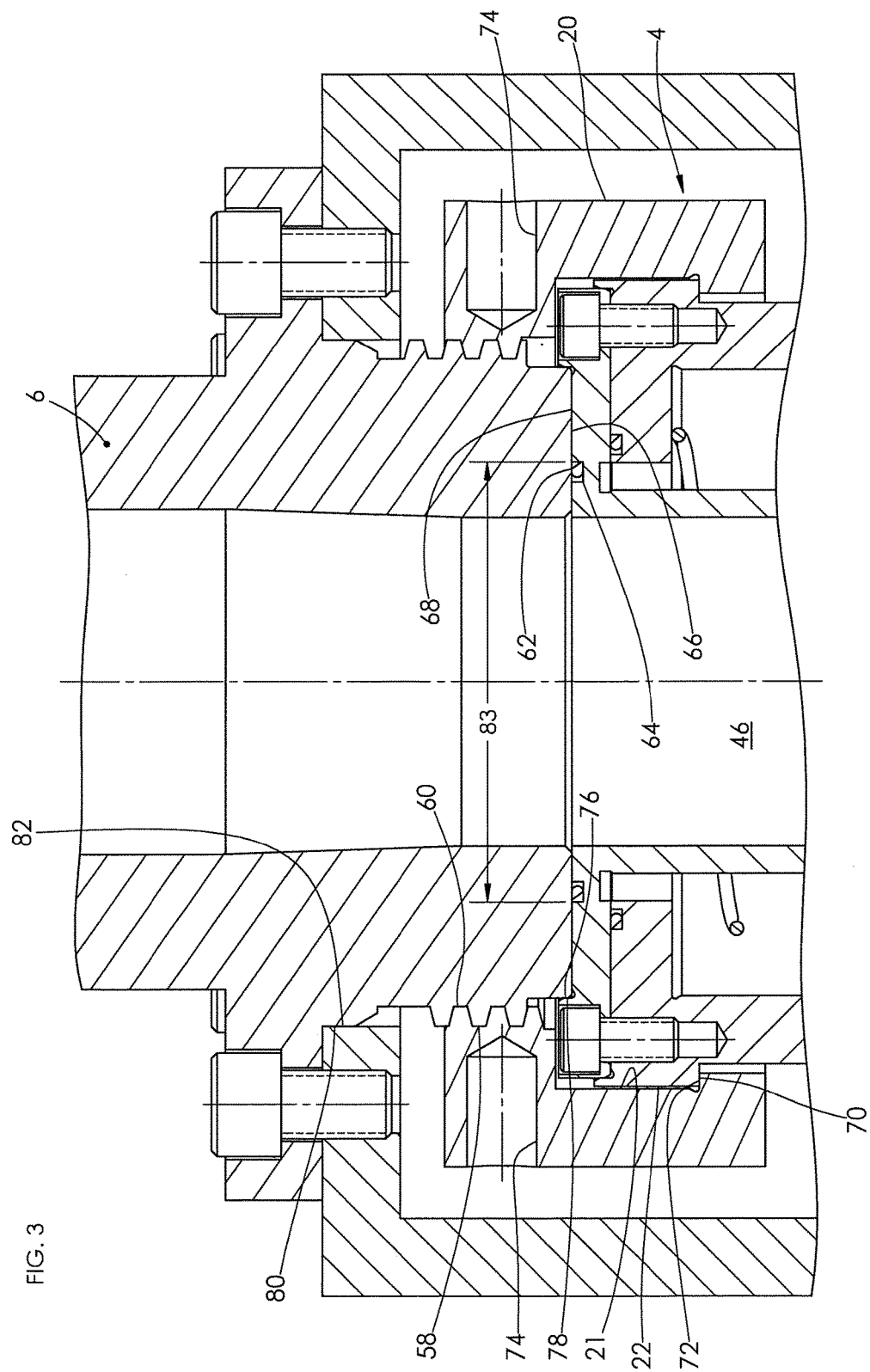
FIG. 3 is a fragmentary longitudinal cross-sectional view that is an enlargement of the cross-section illustrated in FIG. 2, to show more detail.

The fragmentary longitudinal cross-sectional view of FIG. 3 is an enlargement of the cross-section illustrated in FIG. 2, showing more detail of how the sealing assembly 4 may be attached to and sealed with respect to the first conduit 6.

If desired, the first conduit 6 can incorporate external threads 58—as has long been common with the goosenecks of oilfield swivels. If desired, the first retaining collar 20 can incorporate internal threads 60 that engage the external threads 58 of the first conduit 6, and secures the first retaining collar 20 to the first conduit 6.

The sealing assembly 4 is preferably sealed with respect to the first conduit 6 by static conduit seal 62, which may be a resilient sealing element such as the face sealing O-ring that is positioned by a face-type groove 64 in FIG. 3. The static conduit seal 62 prevents leakage of the fluid media 46 into the second fluid 34.

Preferably, the face-type groove 64 has an opening that faces axially toward an end surface 66 of the first conduit 6, and preferably the end surface 66 faces in a generally axial direction toward the sealing assembly 4 and toward second conduit 8. Although shown as a face seal, the static conduit seal 62 could also be a radial seal, but a radial seal would be less desirable. As shown in FIG. 3, the end surface 66 of the first conduit 6 is preferably contacted by a mating surface 68 of the sealing assembly 4.

Preferably the rim 22 has an axially facing rim surface 70, and preferably the slot 21 of the first retaining collar 20 has an axially facing slot surface 72 that faces generally axially toward the axially facing rim surface 70. When securing the sealing assembly 4 to the first conduit 6, one first attaches the first retaining collar 20 to the first conduit 6, then one slides the rim 22 into the slot 21, and then one tightens the internal threads 60 of the first retaining collar 20 with respect to the external threads 58 of the first conduit 6, clamping the end surface 66 and the mating surface 68 together.

Preferably, spanner wrench holes 74 are provided to tighten the first retaining collar 20 to the first conduit 6. If desired, some of the spanner wrench holes 74 may be radially oriented as shown, and some of the spanner wrench holes 74 may be axially oriented (not shown).

Preferably, the sealing assembly 4 has an internal pilot surface 76 that engages and overlaps an external pilot surface 78 of the first conduit 6. Preferably the first conduit 6 has an external pilot surface 80 that engages an internal pilot surface 82 of the conduit support frame 12.

Preferably, the face-type groove 64 has a groove outer diameter 83 that is smaller than the sealing diameter of the shaft element 24, so that the pressure of the fluid media 46 (which may be referred to as the fluid media pressure) produces an axially acting hydraulic force acting in a direction that that forcibly clamps end surface 66 and mating surface 68 together, thus making it unnecessary to use great force when tightening the internal threads 60 of the first retaining collar 20 to the external threads 58 of the first conduit 6, and also making it unlikely that the threaded connection formed by the internal threads 60 and the external threads 58 will come loose in service. (If the groove outer diameter 83 were larger than the sealing diameter of the sealing surface of the shaft element 24, then the threaded connection formed by the internal threads 60 and the external threads 58 would have to be made up very tight, because the threads would have to withstand an axially acting hydraulic force produced by the pressure of the fluid media 46 that would act in a direction that loads the threads.)

The face-type groove 64 is preferably formed in the sealing assembly 4 as shown, but could also be formed in the first conduit 6 if desired.

FIG. 4

Figure 4:
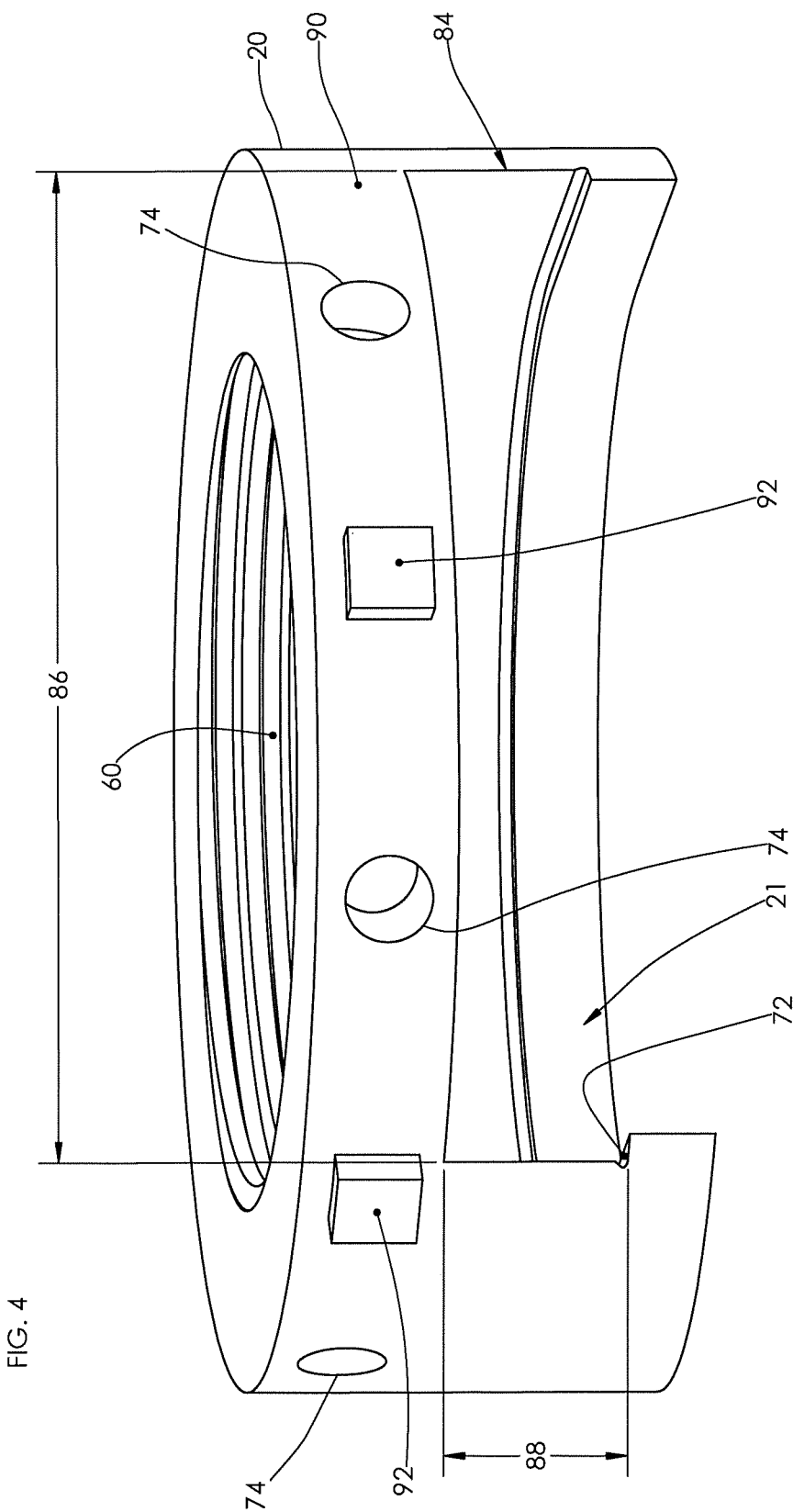
FIG. 4 is a perspective view of a retaining collar that is illustrated in FIG. 1.

FIG. 4 is a perspective view of the first retaining collar 20 that is illustrated in FIGS. 1, 2, and 3. As shown, the first retaining collar 20 is generally annular in form, and has a slot shown generally at 21 that has an axially facing slot surface 72.

The slot 21 is preferably U-shaped, and has an open end 84 having an opening width 86 and an opening height 88 that are sized to be larger the rim of the sealing assembly, so that the rim may enter the slot 21. As noted above, spanner wrench holes 74 are preferably provided to tighten the first retaining collar 20 to the first conduit. If desired, these spanner wrench holes 74 may be formed in the collar exterior surface 90, which faces generally radially outward. If desired, the first retaining collar 20 may have one or more radially outwardly projecting hammer lugs 92. During assembly, one can beat on the hammer lugs 92 with a sledge hammer to tighten the internal threads 60 with respect to the external threads of the first conduit.

FIG. 5

Figure 5:
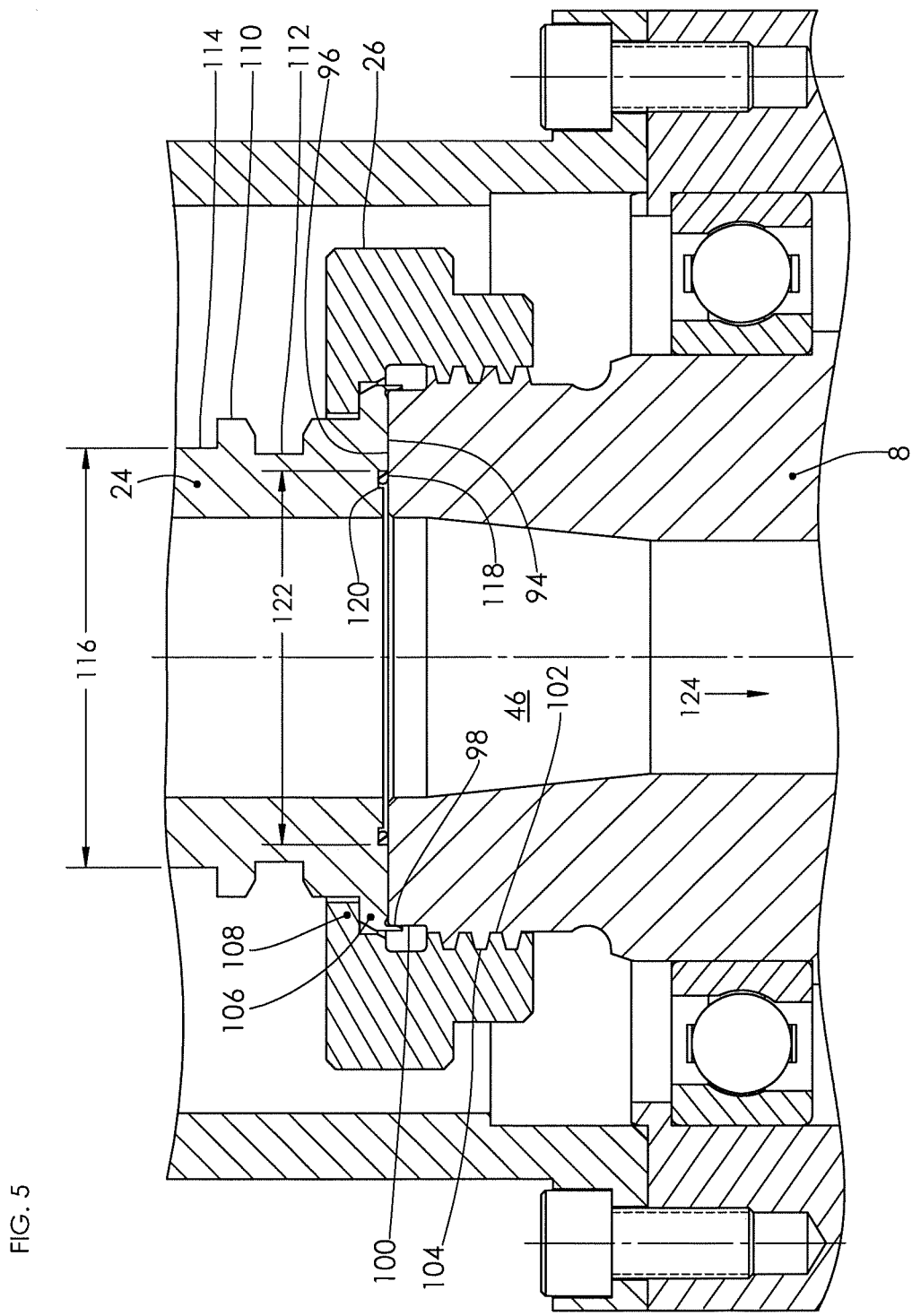
FIGS. 5 to 9 are is a fragmentary longitudinal cross-sectional views that are enlargements of the cross-section illustrated in FIG. 2, to show more detail.

The fragmentary longitudinal cross-sectional view of FIG. 5 is an enlargement of the cross-section illustrated by FIG. 2, showing more detail of how the shaft element 24 may be attached to and sealed with respect to the second conduit 8.

the shaft element 24 has a sealing surface 114 that is engaged by dynamic seals that are not shown in FIG. 5. Preferably, the shaft element 24 has an axially facing surface 94 that faces axially toward and contacts an axially facing end surface 96 of the second conduit 8. Preferably, the shaft element 24 has a radially inwardly facing pilot surface 98 that faces radially inward toward and encircles at least part of a radially outwardly facing pilot surface 100 of the second conduit 8.

The radially outwardly facing pilot surface 100 is illustrated as an external cylindrical surface, and the radially inwardly facing pilot surface 98 is illustrated as an internal pilot surface. If desired, the piloting arrangement could be inverted, so that the shaft element has the radially outwardly facing pilot surface and the second conduit has the radially inwardly facing pilot surface. The important thing is that, preferably, the shaft element 24 be piloted to the second conduit 8, to minimize runout of the sealing surface 114 of the shaft element 24.

Preferably, the second retaining collar 26 incorporates internal threads 102 that engage external threads 104 of the second conduit 8. Preferably, the shaft element 24 has a washpipe rim 106 that extends generally radially outward, and preferably the second retaining collar 26 incorporates a radially inwardly facing clamping shoulder 108 that engages the washpipe rim 106. Preferably, when the internal threads 102 are tightened with respect to the external threads 104, the clamping shoulder 108 engages and applies axial force to the washpipe rim 106, clamping the axially facing surface 94 of the shaft element 24 to the axially facing end surface 96 of the second conduit 8, and securing the shaft element 24 to the second conduit 8.

Preferably, the second retaining collar 26 retains the shaft element 24 to the second conduit 8 as described, however, if desired as a simplification, the shaft element 24 can be an integral part of the second conduit 8, or the shaft element 24 can be an integral part of the second retaining collar 26. If desired, the second retaining collar 26 may be slotted like, and function like, the first retaining collar 20.

The second conduit 8, the shaft element 24, and the second retaining collar 26 are preferably annular in form. If desired, the shaft element 24 may have a stiffening shoulder 110, to help to minimize pressure-induced expansion of the shaft element 24. If desired, the stiffening shoulder 110 may incorporate a lifting groove 112 that may be engaged by a lifting fork (not shown) or other lifting device when installing the sealing assembly.

The shaft element 24 is preferably sealed with respect to the second conduit 8 by a static washpipe seal 118, which may be a resilient sealing element such as the face sealing O-ring that is positioned by a washpipe seal groove 120 in FIG. 5. Although shown as a face seal, the static washpipe seal 118 could also be a radial seal, although a radial seal would be less desirable. Although the washpipe seal groove 120 is illustrated as being formed in the shaft element 24, the washpipe seal groove 120 could just as easily be formed in the second conduit 8. If desired, however, sealing between the shaft element 24 and the second conduit 8 could be established by other means, such as by forming the shaft element 24 integral with the second conduit 8.

The sealing surface 114 of the shaft element 24 has generally cylindrical form having a sealing diameter 116. Preferably, the washpipe seal groove 120 has a groove outer diameter 122 that is smaller than the sealing diameter 116 of the sealing surface 114 of the shaft element 24, such that the pressure of the fluid media 46 produces an axially acting hydraulic force acting in a direction (hydraulic force direction 124) that that forcibly clamps axially facing surface 94 against axially facing end surface 96, thus making it unnecessary to use great force when tightening the internal threads 102 of the second retaining collar 26 to the external threads 104 of the second conduit 8, and also making it unlikely that the threaded connection formed by the internal threads 102 and the external threads 104 will come loose in service. (If the groove outer diameter 122 were larger than the sealing diameter 116 of the sealing surface 114 of the shaft element 24, then the threaded connection formed by the internal threads 102 and the external threads 104 would have to be made up very tight, because the threads would have to withstand an axially acting hydraulic force produced by the pressure of the fluid media 46 that would act in a direction that loads the threads.)

The groove outer diameter 122 has a significant influence on the dynamic runout of the sealing surface 114 of the shaft element 24. If the groove outer diameter 122 is greater than the sealing diameter 116 of the sealing surface 114, then, as a result of the direction of the net hydraulic force acting on the shaft element 24 (opposite to hydraulic force direction 124), the position and dynamic runout of the sealing surface 114 would be influenced by any out-of-squareness of the internal threads 102 of the second retaining collar 26, any out-of-squareness of the external threads 104 of the second conduit 8, and by any out-of-squareness of the mating surfaces of the washpipe rim 106 and the clamping shoulder 108. The potential out-of-squareness of these features does not influence the position and runout of the sealing surface 114 of the shaft element 24 if the groove outer diameter 122 is smaller than the sealing surface 114 of the shaft element 24, because the pressure of the fluid media 46 creates an axially acting force that acts on the shaft element 24 in hydraulic force direction 124, which puts no axial load on the threaded connection that the retains the second retaining collar 26 and the second conduit 8. As a result, the washpipe rim 106 and the clamping shoulder 108 can be much lighter features, because they do not have to withstand any axially acting hydraulic force.

The washpipe seal groove 120 is preferably formed in the shaft element 24 as shown, but could also be formed in the second conduit 8 if desired.

It should be understood that, if desired, the shaft element 24 could be integral with the second conduit 8, or retained to the second conduit 8 by a bolted flange, our could be threaded directly to the second conduit 8, or could be retained to the second conduit 8 by other suitable means.

FIG. 6

Figure 6:
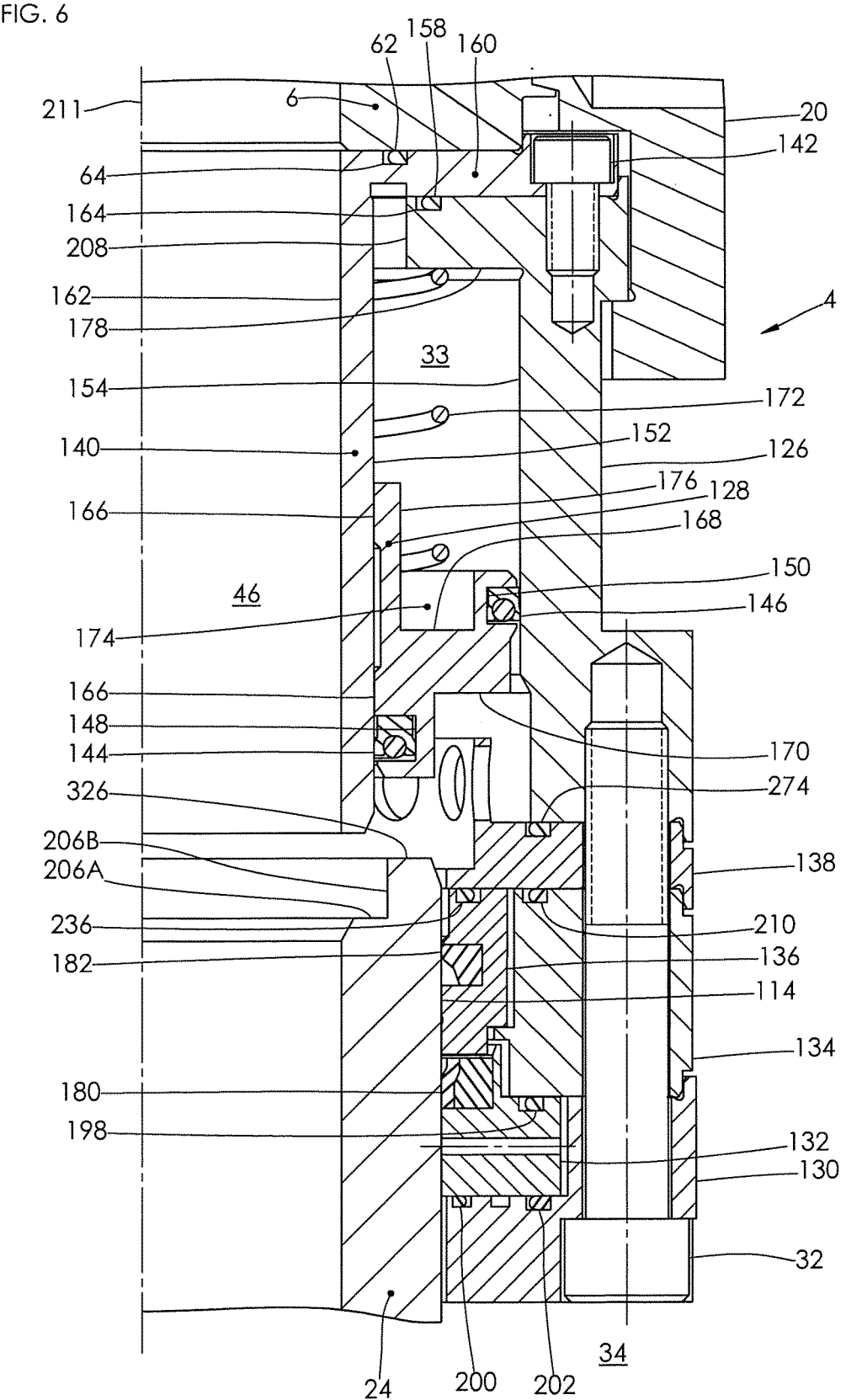

The fragmentary longitudinal cross-sectional view of FIG. 6 is an enlargement of the cross-section illustrated in FIG. 2, showing some of the interior detail of the sealing assembly 4.

The sealing assembly 4 preferably includes a machine housing 126, piston 128, bulkhead housing 130, backup ring 132, ring retainer 134, seal carrier 136, carrier retainer 138, and piston guide 140, all of which preferably being of annular form, as shown. The piston guide 140 preferably includes a through-passageway 162 to allow passage of the fluid media 46 between the first and second conduits 6 and 8. Embodiments are possible, however, where the piston 128 is not annular, and the piston guide 140 is omitted. The machine housing 126, carrier retainer 138, ring retainer 134, and bulkhead housing 130 are preferably retained together by a pattern of bolts 32.

It can be appreciated that, if desired as a simplification, in certain circumstances the machine housing 126 and first retaining collar 20 could be integrated into a single component. It can also be appreciated that, if desired as a simplification, in certain circumstances the first conduit 6, the first retaining collar 20, and the machine housing 126 could be integrated into a single component.

The backup ring 132 is preferably captured between surfaces of the bulkhead housing 130 and the ring retainer 134, and the seal carrier 136 is preferably captured between surfaces of the ring retainer 134 and the carrier retainer 138.

The piston guide 140 is preferably mounted on and secured to the machine housing 126 by one or more threaded fastener 142 that preferably passes through a radially extending flange 160 of the piston guide 140, however alternate embodiments are possible. For example, as an alternative, the piston guide 140 could be welded to the machine housing 126. As another alternative, the piston guide 140 could be mounted on, or as part of, the carrier retainer 138.

The piston 128 preferably has an inner seal groove 148 and an outer seal groove 150. The inner and outer seal grooves 148 and 150 preferably are annular recesses in the piston 128. Preferably, an inner sliding seal 144 is located at least partially within the inner seal groove 148, and preferably an outer sliding seal 146 is located at least partially within the outer seal groove 150. The inner sliding seal 144 is preferably radially compressed between a guide surface 152 of the piston guide 140 and the inner seal groove 148 of the piston 128, establishing a sealed relationship with the guide surface 152 and establishing a sealed relationship with the piston 128, and thereby preventing leakage between the piston 128 and the piston guide 140. The outer sliding seal 146 is preferably radially compressed between a housing bore 154 of the machine housing 126 and the outer seal groove 150 of the piston 128, establishing a sealed relationship with the housing bore 154 and establishing a sealed relationship with the piston 128, and thereby preventing leakage between the piston 128 and the housing bore 154. Preferably, the housing bore 154 of the machine housing 126 and the guide surface 152 of the piston guide 140 are generally cylindrical.

As a result of the inner and outer sliding seals 144 and 146, the piston 128 establishes an annular sealed area between the guide surface 152 of the piston guide 140 and the housing bore 154 of the machine housing 126.

In other words, the inner seal groove 148 compresses the inner sliding seal 144 against the piston guide 140, causing the inner sliding seal 144 to establish sealing contact pressure with both the inner seal groove 148 and the piston guide 140, and the outer seal groove 150 compresses the outer sliding seal 146 against the housing bore 154, causing the outer sliding seal 146 to establish sealing contact pressure with both the outer seal groove 150 and the housing bore 154. By having inner and outer sliding seals 144 and 146 in sealing engagement with the piston guide 140 and the housing bore 154 respectively, the piston 128 separates the fluid media 46 from the first fluid 33. The first fluid 33 is preferably a liquid-type lubricant, such as oil or hydraulic fluid. Because the piston 128 is positioned to be able to slide axially along the piston guide 140 and axially within the housing bore 154, the pressure of the fluid media 46 is conveyed to the first fluid 33 with relative accuracy.

Since the first fluid 33 is a physical entity that supports the axial force acting on the piston 128 that is created by the pressure of the fluid media 46, the seal lubricant may be considered to be an inherent structural component of the sealing assembly 4.

Preferably, the guide surface 152 of the piston guide 140 faces radially outward, toward the housing bore 154 of the machine housing 126, and preferably the housing bore 154 of the machine housing 126 faces radially inward toward the guide surface 152 of the piston guide 140. Preferably the housing bore 154 of the machine housing 126 is located radially outward of, and encircles at least part of the piston 128 and at least part of the guide surface 152 of the piston guide 140. Preferably, at least part of the piston 128 is located radially outward of and encircles at least part of the guide surface 152 of the piston guide 140. Preferably, at least a part of the piston 128 is located radially between the housing bore 154 of the machine housing 126 and the guide surface 152 of the piston guide 140. Preferably, at least part of the piston 128 is located inside of the housing bore 154 of the machine housing 126.

The piston 128 preferably incorporates at least one radially inwardly facing bore surface 166 that faces toward, and may be guided by, the guide surface 152 of the piston guide 140. Preferably, the radially inwardly facing bore surface 166 of the piston 128 locates the piston 128 laterally, with respect to the guide surface 152 of the piston guide 140. Preferably, the radially inwardly facing bore surface 166 surrounds at least part of the guide surface 152 of the piston guide 140, and at least part of the guide surface 152 is preferably located inside of, and is encircled by, the radially inwardly facing bore surface 166 of the piston 128.

The first fluid 33 is preferably located on one side of the piston, between the guide surface 152 of the piston guide 140 and the housing bore 154 of the machine housing 126. The pressure of the fluid media 46 acts on one end of the piston over the above-described annular sealed area, creating an axial hydraulic force that is reacted by the first fluid 33. As a result, the pressure of the first fluid 33 is roughly the same as the pressure of the fluid media 46.

Preferably, a guide seal 158 establishes sealing between the piston guide 140 and the machine housing 126, preventing leakage of the first fluid 33 into the second fluid 34. The guide seal 158 is preferably employed in a face sealing orientation, as shown. The guide seal 158 is preferably mounted in and located by a guide seal groove 164. In FIG. 6, the guide seal groove 164 is formed in the machine housing 126 and has an opening facing the piston guide 140, however the guide seal groove could just as easily be formed in the piston guide 140.

Preferably, at least a portion of the sealing surface 114 of the shaft element 24 is located within the bulkhead housing 130, the shaft element 24 being relatively movable with respect to the bulkhead housing 130. Preferably, the sealing surface 114 of the shaft element 24 has a portion thereof exposed to the fluid media 46, a portion thereof exposed to the first fluid 33, and a portion thereof exposed to the second fluid 34. Thus it can be said that, preferably, the shaft element 24 has a portion thereof exposed to the fluid media 46, a portion thereof exposed to the first fluid 33, and a portion thereof exposed to the second fluid 34. In an oilfield drilling swivel, the second fluid 34 is typically the atmosphere of the planet earth. In other application, the second fluid 34 may be something other than the atmosphere of the planet earth.

If desired, the piston 128 can be axially loaded by a helical spring 172. Axial compression of the helical spring 172 produces an axially acting spring force that acts on the piston 128, changing the pressure of the first fluid 33, compared to the pressure of the fluid media 46. The degree of pressure change is equal to the magnitude of the axially acting spring force divided by the annular sealed area between the housing bore 154 and the piston guide 140. If the spring is compressed against the first piston end 168 of the piston 128 as shown, the pressure of the first fluid 33 will be less than the pressure of the fluid media 46. If the spring is compressed against the second piston end 170 of the piston 128, the pressure of the first fluid 33 will be greater than the pressure of the fluid media 46. If it is desired to compress a spring against the first piston end 168 of the piston 128, one can save axial space by providing a spring recess 174 that may form a spring pilot 176.

The first piston end 168 of the piston 128 is preferably a generally planar surface that faces axially, toward an internal reservoir shoulder 178 of the machine housing 126, and toward and contacting the helical spring 172. The spring pilot 176 is preferably a radially outwardly facing generally cylindrical surface that is located at least partially within the helical spring 172, and at least partially within the housing bore 154 of the machine housing 126 and radially inward of the outer seal groove 150. Preferably, at least a portion of the radially inwardly facing bore surface 166 of the piston 128 is located in a radially intermediate location with respect to the spring pilot 176, and the guide surface 152 of the piston guide 140. When used in this specification, the word "intermediate" has the normal dictionary meaning of, "occurring in the middle of a . . . series" (Merriam-Webster's Learner's Dictionary).

During operation of the sealing assembly 4, the pressure of the fluid media 46 is typically much greater than the pressure of the second fluid 34. Since the pressure of the first fluid 33 is approximately balanced to the pressure of the pressurized fluid (give or take pressure changes caused by the optional helical spring 172, and give or take the pressure changes caused by the friction of the inner and outer sliding seals 144 and 146), the pressure of the first fluid 33 is typically greater than the pressure of the second fluid 34 during operation of the sealing assembly 4.

The sealing assembly 4 preferably includes a pressure-retaining seal 180 and a partitioning seal 182 that are each in sealing engagement with the sealing surface 114 of the shaft element 24. Preferably, the first fluid 33 contacts the pressure-retaining seal 180 and the partitioning seal 182. Some of the first fluid 33 is conducted from the lubricant-filled region that is located between the guide surface 152 of the piston guide 140 and the housing bore 154 of the machine housing 126 to a sealed region between the pressure-retaining seal 180 and a partitioning seal 182 by communication means that are not shown in FIG. 6. The partitioning seal 182 partitions the fluid media 46 from the first fluid 33, and withstands any difference between the pressures of the fluid media 46 and the first fluid 33. The pressure-retaining seal 180 partitions the first fluid 33 from the second fluid 34, and withstands the usually large pressure difference between the first fluid 33 and the second fluid 34 that occurs in service. When used herein, the term "partitions" is not meant to imply perfect separation of the two fluids, as many different types of dynamic seals have small but acceptable leak rates. For example, the type of packing most commonly used in oilfield washpipe packings (see U.S. Pat. No. 2,764,428) has a slow but acceptable leak rate that is apparently related to the surface texture created by fabric reinforcement of the elastomer used to form the packing. For another example, various types of seals developed by the Inventors and their associates, and sold by the Assignee, have a slow but acceptable leak rate resulting from a hydrodynamic pumping action that pumps seal lubricant into the dynamic sealing interface in response to relative rotation.

The piston 128, the machine housing 126 and the piston guide 140 establish a lubricant reservoir for the first fluid 33, in order to accommodate normal seal leakage, and in order to accommodate any thermal expansion or contraction of the first fluid 33, it being understood within the industry that a lubricant reservoir can be established by other means, such as a diaphragm or bladder, or a non-annular piston within a reservoir housing.

If desired, the first fluid 33 and the first fluid pressure can be provided by any suitable pressure supply, such as, but not limited to, one of the types of pressure supplies described in conjunction with the prior art. One form of a suitable pressure supply would be one of the prior art computer-controlled pressure supplies, where a hydraulic fluid is circulated through an orifice. Either the orifice size or the flow rate is varied to appropriately vary the pressure. Another example of a suitable pressure supply would be the differential area piston arrangement described in conjunction with prior art washpipe assemblies; for example, see the lubricant supplies shown in U.S. Pat. Nos. 2,150,529, 2,608,385, and 6,007,105. Various types of prior art pressure supplies are described in the "Kalsi Seals Handbook," which is a publication of Kalsi Engineering Inc. of Sugar Land, Tex.

For the purposes of this specification, the term "fluid" has its broadest meaning, encompassing both liquids and gases. The first fluid 33 is preferably a liquid-type lubricant such as a synthetic or natural oil, although other fluids are also perfectly suitable in some applications. The second fluid 34 may be any type of fluid that the pressure-retaining seal 180 may be exposed to in service, and the fluid media 46 may be any type of fluid that the partitioning seal 182 may be exposed to in service.

Axial motion of the piston 128 accommodates any leak rate of the pressure-retaining seal 180 and the partitioning seal 182, and resulting gradual loss of the first fluid 33. Likewise, the piston 128 accommodates thermal expansion and contraction of the first fluid 33 through axial movement.

Preferably, at least a portion of the machine housing 126 is located radially outward of, radially spaced from, and encircles at least a portion of the guide surface 152 of the piston guide 140. Preferably, at least a portion of the machine housing 126 is located radially outward of and encircles at least a portion of the piston 128, Preferably, at least a portion of the machine housing 126 is located radially outward of and encircles at least a portion of the carrier retainer 138. Preferably, at least a portion of the guide surface 152 of the piston guide 140 is located within and surrounded by the machine housing 126. Preferably, at least a portion of the piston 128 is located within and surrounded by the machine housing 126. Preferably, at least a portion of the guide surface 152 of the piston guide 140 is located within and surrounded by the machine housing 126.

The machine housing 126 preferably includes a piston recess bore 208 that is more distant from the theoretical axis 211 of the sealing assembly 4, compared to the spring pilot 176. When the helical spring 172 is omitted from the sealing assembly 4 as a simplification, the spring pilot 176 portion of the piston 128 can enter the piston recess bore 208, thus increasing the volumetric displacement of the piston 128 as the piston 128 moves toward the first conduit 6. In other words, the piston recess bore 208 allows for a larger effective reserve volume of first fluid 33.

As the first fluid 33 is depleted, the spring pilot 176 of the piston 128 moves toward and may enter the piston recess bore 208, such that at part of the piston recess bore 208 preferably surrounds a portion of the piston 128. Preferably, a portion of the guide surface 152 is exposed to and contacted by the fluid media 46 and a portion of the guide surface 152 is exposed to and contacted by the first fluid 33. Preferably, a portion of the housing bore 154 is exposed to and contacted by the fluid media 46 and a portion of the guide surface 152 is exposed to and contacted by the first fluid 33. Preferably, a portion of the piston 128 is exposed to and contacted by the fluid media 46 and a portion of the piston 128 is exposed to and contacted by the first fluid 33.

The shaft element 24 is movable, and preferably rotationally movable, relative to the piston 128, the machine housing 126, the piston guide 140, the seal carrier 136, the ring retainer 134, the backup ring 132, the bulkhead housing 130, and the carrier retainer 138. In other words, the shaft element 24 is preferably relatively movable with respect to all the components that are mounted to the first conduit 6.

The shaft element 24, the piston 128, the machine housing 126, the piston guide 140, the seal carrier 136, the ring retainer 134, the backup ring 132, the bulkhead housing 130, and the carrier retainer 138 may be made from any suitable material, such as metal.

Preferably, a carrier seal 236, a retainer seal 210, a ring first end seal 198, an inner balancing seal 200, and an outer balancing seal 202 are axially compressed face sealing elements, such as such as but not limited to O-rings, and comprised preferably at least in part from polymeric sealing material, and preferably including at least some elastomer. The aforementioned face sealing elements establish a sealed relationship with the components they are compressed between by virtue of the sealing contact force they establish at the interfaces with the components they are compressed between. This contact force allows the face sealing elements to block the passage of fluid between the components they are compressed between. The aforementioned face sealing elements, and their respective locating seal grooves, are preferably radially spaced from, located radially outward from, and encircle the shaft element 24, and are preferably radially spaced from, located radially outward from, and encircle the sealing surface 114 of the shaft element 24.

The sealing material referenced herein can be any sealing material, including elastomeric or rubber-like materials such as an elastomer compound or a combination of one or more elastomer compounds, and including various plastic materials, and including different materials bonded together to form a composite structure or inter-fitted together, or stacked axially together radially or axially, and including a combination of a suitable plastic and an elastomer compound, and including fabric reinforced elastomer.

Preferably, at least a portion of each of the following seals is exposed to the first fluid 33: static conduit seal 62; inner sliding seal 144; outer sliding seal 146; guide seal 158; pressure-retaining seal 180; partitioning seal 182; ring first end seal 198; inner balancing seal 200; outer balancing seal 202; retainer seal 210; and carrier seal 236.

Preferably, at least a portion of each of the following seals is exposed to the second fluid 34: static conduit seal 62; guide seal 158; pressure-retaining seal 180; ring first end seal 198; inner balancing seal 200; outer balancing seal 202; retainer seal 210; and a housing seal 274.

Preferably, at least a portion of each of the following seals is exposed to the fluid media 46: static conduit seal 62; inner sliding seal 144; outer sliding seal 146; partitioning seal 182; carrier seal 236; and housing seal 274.

The shaft element 24 shares the theoretical axis 211 of the sealing assembly 4 that is schematically represented by a centerline, and the ring retainer 134 is separated from the axis by a radial distance, the backup ring 132 is separated from the axis by a radial distance, and preferably, the radial distance separating the ring retainer 134 from the axis is greater than the radial distance separating the backup ring 132 from the axis, and preferably at least a part of the ring retainer 134 is exposed to the first fluid 33, and preferably a second ring end 256 of the backup ring 132 faces in a generally axial direction away from the ring retainer 134.

The sealing surface 114 is separated from the theoretical axis 211 by a radial distance, and preferably, the radial distance separating the ring retainer 134 from the axis is greater than the radial distance separating the sealing surface 114 from the axis, and the radial distance separating the backup ring 132 from the axis is preferably no less than the radial distance separating the sealing surface 114 from the axis. Preferably, the shaft element 24 has an axially facing shoulder 326, and no portion of the backup ring 132 surrounds the axially facing shoulder 326.

The machine housing 126, bulkhead housing 130, ring retainer 134, and carrier retainer 138 are preferably stationary with respect to one another in the axial and circumferential directions.

FIG. 7

Figure 7:
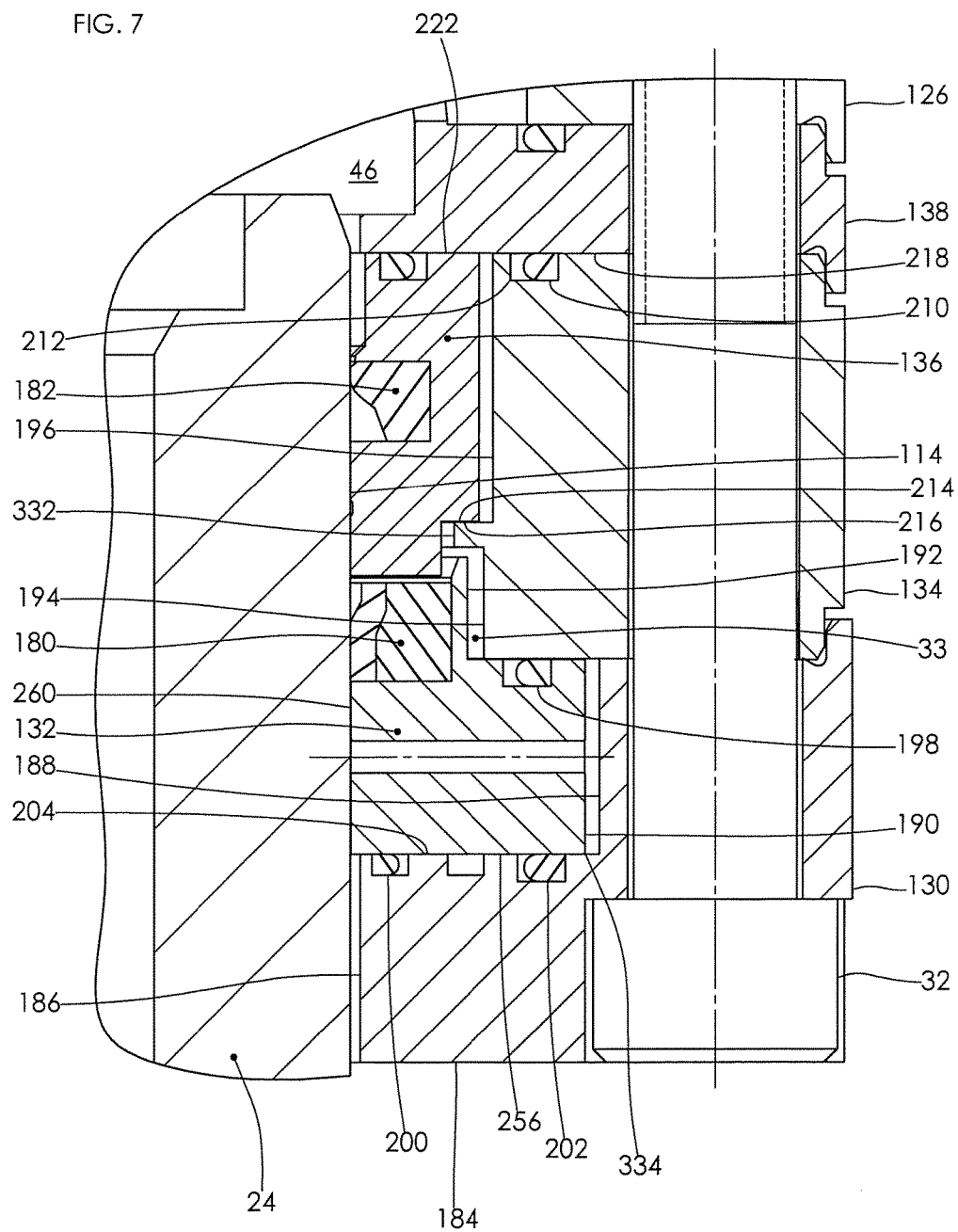

The fragmentary longitudinal cross-sectional view of FIG. 7 is an enlargement of the cross-section illustrated in FIG. 2, to better show some of the interior detail of the sealing assembly 4, including key parts of the invention.

Preferably, as described previously, a bulkhead housing 130, a ring retainer 134 and a carrier retainer 138, all of annular form are threadedly retained together, and preferably are threadedly retained to the machine housing 126. Preferably the means of the threaded retention of these components is provided by a pattern of bolts 32. If desired, the carrier retainer 138 and the machine housing 126 can be integrated into a single component, however this may require adjustment (i.e. reduction) to some of the dimensions of the machine housing 126 and the components that fit within it. If desired, as a simplification, the carrier retainer 138 can be eliminated, such that the seal carrier 136 adjoins the machine housing 126, however this may require adjustment (i.e. reduction) to some of the dimensions of the machine housing 126 and the components that fit within it.

The bulkhead housing 130 preferably incorporates a shaft passageway 186 that faces generally radially inward, and preferably is located radially outward of and surrounds a portion of the shaft element 24, and is preferably located radially outward of and surrounds a portion of the sealing surface 114 of the shaft element 24. The shaft passageway 186 is typically large enough to accommodate anticipated levels of relative lateral motion between the bulkhead housing 130 and the shaft element 24 without heavily loaded contact occurring between the shaft element 24 and the shaft passageway 186.

The bulkhead housing 130 may also incorporate a ring pocket bore 188 that is located radially outward of, radially spaced from, and encircles at least a portion of the ring outer surface 190 of the backup ring 132, and has radial clearance with respect to the ring outer surface 190. The backup ring 132 is preferably located radially between the ring pocket bore 188 and the sealing surface 114. For ease of manufacture, the ring outer surface 190 may be generally cylindrical, if desired.

It can be appreciated that it is a matter of design choice whether to incorporate the ring pocket bore 188 as a feature of the bulkhead housing 130 or as a feature the ring retainer 134, the feature merely providing the necessary axial and radial space to accommodate the backup ring 132. It can therefore be said that the ring pocket bore can be formed in one of the components selected from the group consisting of the bulkhead housing 130 and the ring retainer 134. It is preferred that the ring pocket bore 188 be a feature of the bulkhead housing 130, because then, the material radially outward of the ring pocket bore 188 strengthens the bulkhead housing 130.

The radial distance between the ring pocket bore 188 and the sealing surface 114 of the shaft element 24 is preferably greater than the radial distances separating the following features from the sealing surface 114: The ring outer surface 190; the annular extension 192; the annular receiving recess 194; the carrier recess bore 196; the ring first end seal 198; the inner balancing seal 200; and the outer balancing seal 202. Preferably, a locating shoulder 204 of the bulkhead housing 130 and the ring pocket bore 188 together form a recess, which might be termed a cavity, in which at least part of the backup ring 132 resides, as shown. Preferably, this recess or cavity is a result of the bulkhead housing 130 forming the ring pocket bore 188, because this arrangement provides the bulkhead housing 130 with more strength by virtue of the inclusion of the portion of the bulkhead housing 130 that is located radially outward from the ring pocket bore 188, making the bulkhead housing 130 stiffer and stronger and more capable of handling the hydraulic force of the pressure of the first fluid 33 acting axially upon the bulkhead housing 130, thus allowing the axial length between the locating shoulder 204 and the bulkhead end surface 184 of the bulkhead housing 130 to be shorter than it would be if the ring pocket bore 188 were part of the ring retainer 134. Preferably, all the backup ring 132 and all the bulkhead housing 130 are larger than the sealing surface 114 of the shaft element 24.

Preferably, a portion of the backup ring 132 is exposed to and contacted by the first fluid 33 and preferably a portion of the backup ring 132 is exposed to and contacted by the second fluid 34, and preferably no portion of the backup ring 132 is exposed to or contacted by the fluid media 46. Preferably, a portion of the ring retainer 134 is exposed to and contacted by the first fluid 33 and preferably a portion of the ring retainer 134 is exposed to and contacted by the second fluid 34, and preferably, no portion of the ring retainer 134 is exposed to or contacted by the fluid media 46. Preferably, a portion of the bulkhead housing 130 is exposed to and contacted by the first fluid 33 and preferably a portion of the bulkhead housing 130 is exposed to and contacted by the second fluid 34, and preferably no portion of the bulkhead housing 130 is exposed to or contacted by the fluid media 46. Preferably, the ring retainer 134 surrounds at least part of the sealing surface 114 of the shaft element 24, and preferably, at least a portion of the sealing surface 114 is located inside of and is radially spaced from the ring retainer 134.

Preferably the pattern of bolts 32 pass axially through the bulkhead housing 130, the ring retainer 134, and the carrier retainer 138, and threadedly engage the machine housing 126, however, arrangements are possible where the bolts pass axially through the bulkhead housing and the ring retainer, and threadedly engage the carrier retainer, and arrangements are possible where the bolts pass axially through the machine housing, the carrier retainer, and the ring retainer, and threadedly engage the bulkhead housing. The bulkhead housing 130 and the ring retainer 134 are both of annular form, and preferably both are located radially outward of, radially spaced from, and encircle at least a portion of the sealing surface 114 of the shaft element 24, and preferably, at least some portions of the sealing surface 114 of the shaft element 24 are located within and surrounded by the bulkhead housing 130 and the ring retainer 134. If desired, to form a convenient modular sub-assembly, the ring retainer 134 can be secured to the bulkhead housing 130 with small axially oriented screws that are not shown.

In service, the pressure of the fluid media 46 is greater than the pressure of the second fluid 34, and a purpose of the sealing assembly 4 is to prevent loss of the fluid media 46 into the second fluid 34. When the present invention is used in a hydraulic swivel, the fluid media 46 is typically absent.

The sealing surface 114 of the shaft element 24 is an externally oriented surface of generally cylindrical form, and preferably faces radially outward toward the bulkhead housing 130, backup ring 132, ring retainer 134, seal carrier 136, pressure-retaining seal 180, and partitioning seal 182.

The ring retainer 134 is preferably sealed with respect to the carrier retainer 138 by a retainer seal 210, which is preferably in compressed contact with and between the carrier retainer 138 and the ring retainer 134, it being understood that if the carrier retainer 138 were, as a simplification, eliminated or made integral with the machine housing 126, then the retainer seal 210 would be in axially compressed contact between the ring retainer 134 and the machine housing 126.

If desired, the retainer seal 210 can be located by a retainer seal groove 212 that is formed in the ring retainer 134. The retainer seal 210 is preferably a face seal (i.e. axially compressed), as shown, but could be implemented as a radial seal if desired as a design choice. The retainer seal 210 is preferred to be a face seal because it reduces the force the mechanic has to apply to the components during assembly, compared to a radially compressed seal, and because a face seal is much less likely to be damaged by differential pressure, compared to a radial seal. For these reasons, the illustrated sealing arrangement includes no radial static seals. If desired, the retainer seal groove 212 could be formed in the carrier retainer 138 rather than the ring retainer 134. It should be understood that, if as a simplification, the carrier retainer 138 was eliminated or integrated into the machine housing 126, then the retainer seal groove 212 could be formed in the machine housing 126 if desired.

Preferably, the ring retainer 134 is located radially outward of, and encircles, at least a portion of the shaft element 24 and is located radially outward of and encircles at least a portion of the seal carrier 136. The carrier recess bore 196 of the ring retainer 134 is preferably a generally inwardly facing cylindrical surface, and the recess shoulder 214 is preferably an axially facing planar surface that faces toward, adjoins, and preferably abuts a mating carrier shoulder 216 of the seal carrier 136. At least a portion of the seal carrier 136 is preferably located between the recess shoulder 214 of the ring retainer 134 and a retaining shoulder 218 of the carrier retainer 138, it being understood that if, as a simplification the carrier retainer 138 was eliminated or integrated with the machine housing 126, then the machine housing 126 would define the retaining shoulder 218. The shaft element 24 preferably passes completely through the bulkhead housing 130, backup ring 132, ring retainer 134, seal carrier 136, pressure-retaining seal 180, and partitioning seal 182, as shown.

The partitioning seal 182 and the pressure-retaining seal 180 are radially compressed sealing elements, such as Kalsi-brand rotary shaft seals, and are comprised preferably at least in part from polymeric sealing material, and preferably include at least some elastomer. The partitioning seal 182 and the pressure-retaining seal 180 establish a sealed relationship with the components they contact by virtue of the sealing contact force they establish at the interfaces with the components they contact. This contact force, which is preferably created by radial seal compression, allows the partitioning seal 182 and the pressure-retaining seal 180 to substantially block the passage of fluid between the components they contact and are preferably compressed between, and retain the fluid pressure, it being understood that Kalsi-brand rotary shaft seals do pump a minute film of the first fluid 33 through the interface between the seals and the shaft element 24, for the purpose of lubrication of the rotary sealing elements. Once a film of first fluid 33 passes through the dynamic interface of the pressure-retaining seal 180, it becomes part of, and attains the pressure of, the second fluid 34. Once a film of first fluid 33 passes through the dynamic interface of the partitioning seal 182, it becomes part of, and attains the pressure of, the fluid media 46.

Within the family of Kalsi-brand rotary shaft seals, the partitioning seal 182 is preferably selected from the group of hydrodynamic rotary seals described in the following U.S. Pat. No. 9,121,504 Rotary seal with improved film distribution; U.S. Pat. No. 9,121,503 Rotary seal with supported inlet; U.S. Pat. No. 9,086,151 Low torque hydrodynamic lip geometry for rotary seals; U.S. Pat. No. 8,550,467 Rotary seal with improved film distribution; U.S. Pat. No. 8,056,904 Low torque hydrodynamic lip geometry for bi-directional rotation seals; U.S. Pat. No. 7,770,898 Stabilizing geometry for hydrodynamic rotary seals; U.S. Pat. No. 7,562,878 Low torque hydrodynamic lip geometry for bi-directional rotation seals; U.S. Pat. No. 6,382,634 Hydrodynamic seal with improved extrusion abrasion and twist resistance; and/or U.S. Pat. No. 6,315,302 Skew resisting hydrodynamic seal. The partitioning seal 182 could be any suitable type of seal, including some lip-type seals.

Within the family of Kalsi-brand rotary shaft seals, the pressure-retaining seal 180 is preferably selected from the group of hydrodynamic rotary seals described in the following U.S. Pat. No. 9,121,504 Rotary seal with improved film distribution; U.S. Pat. No. 9,086,151 Low torque hydrodynamic lip geometry for rotary seals; U.S. Pat. No. 8,550,467 Rotary seal with improved film distribution; U.S. Pat. No. 8,056,904 Low torque hydrodynamic lip geometry for bi-directional rotation seals; U.S. Pat. No. 7,562,878 Low torque hydrodynamic lip geometry for bi-directional rotation seals; and/or U.S. Pat. No. 6,382,634 Hydrodynamic seal with improved extrusion abrasion and twist resistance.

Preferably, the ring retainer 134 has a retainer innermost surface 332 having a diameter, and the retainer innermost surface 332 preferably encircles the sealing surface 114 of the shaft element 24, and preferably, the ring inner surface 260 of the backup ring 132 has a diameter, and preferably the diameter of the ring inner surface 260 is smaller than the diameter of the retainer innermost surface 332.

Preferably, the inner and outer balancing seals 200 and 202 are located directly radially outward of and encircle the sealing surface 114 of the shaft element 24. Preferably, the second ring end 256 of the backup ring 132 has an outer peripheral edge 334 that is spaced from the shaft element 24 by a radial distance, and preferably the outer balancing seal 202 is spaced from the shaft element 24 by a radial distance, and preferably, the radial distance spacing the outer peripheral edge 334 from the shaft element 24 is greater than the radial distance spacing the outer balancing seal 202 from the shaft element 24, the outer peripheral edge 334 preferably being exposed to the pressure of the second fluid 34, and preferably an annular portion of the second ring end 256 that is located between the inner and outer balancing seals 200 and 202 is exposed to the pressure of the first fluid 33. Preferably, at least part of the ring outer surface 190 is located more radially outward of the shaft element 24 than the outer balancing seal 202, and preferably none of the ring outer surface 190 is exposed to the pressure of the first fluid 33.

Preferably the ring inner surface 260 has a diameter and is the innermost surface of the ring retainer 134, and preferably the diameter of the ring inner surface 260 is smaller than the diameter of the innermost surface of the ring retainer 134.

One purpose of the backup ring 132 is to support the pressure-retaining seal 180 against differential pressure that may be acting across the pressure-retaining seal 180 due to the first fluid pressure being greater than the second fluid pressure. An aspect of the backup ring 132 is to prevent or minimize the extrusion damage of the pressure-retaining seal 180. Another aspect of the backup ring 132 is to improve any intended hydrodynamic interfacial lubrication of the pressure-retaining seal 180 by minimizing the differential pressure induced contact pressure between the pressure-retaining seal 180 and the sealing surface 114 of the shaft element 24 near the backup ring 132.

FIG. 8

Figure 8:
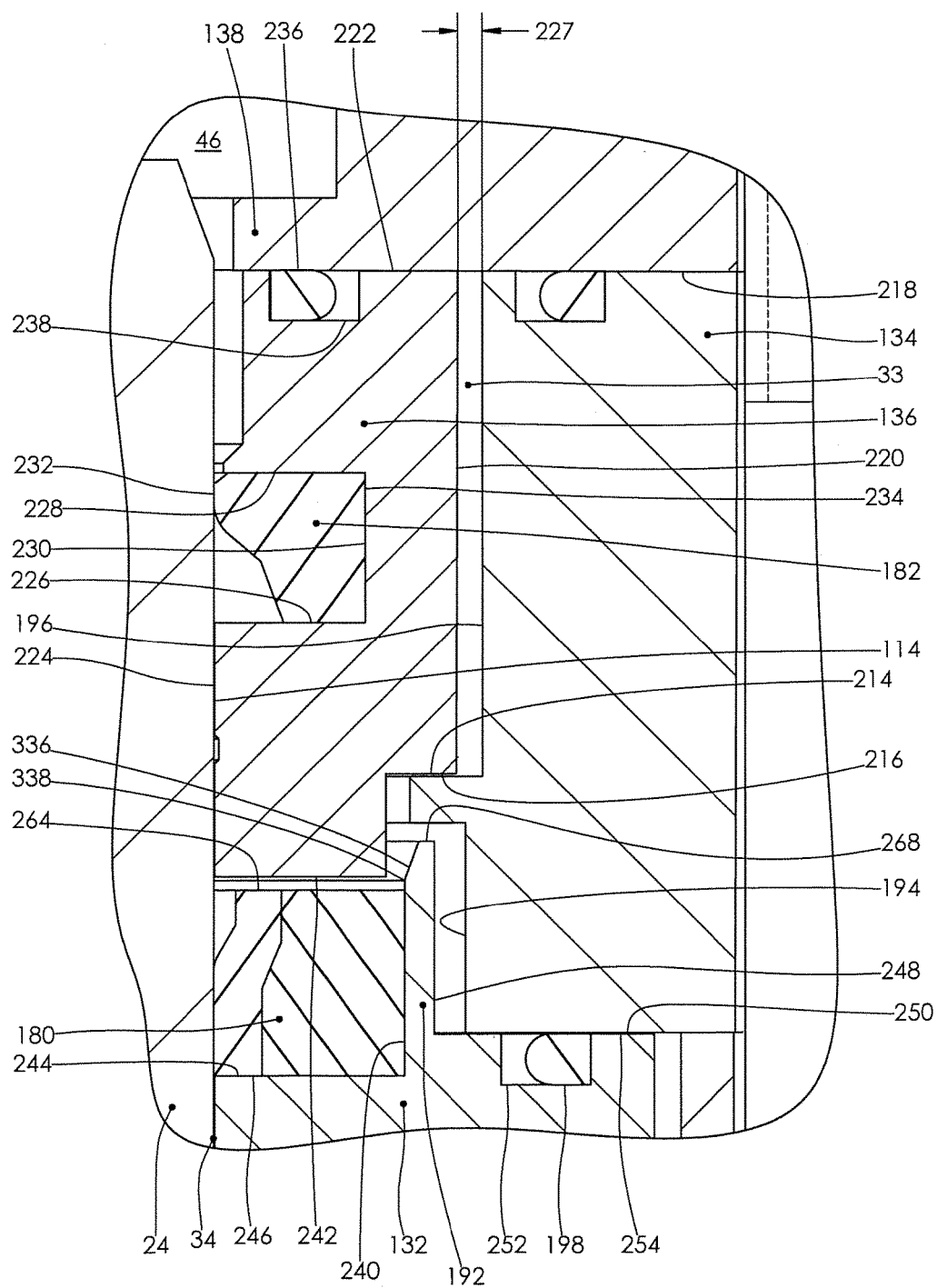

The fragmentary longitudinal cross-sectional view of FIG. 8 is an enlargement of the cross-section illustrated in FIG. 2, to better show some of the interior detail of the sealing assembly 4.

Preferably, the seal carrier 136 is located radially outward of and encircles at least a portion of the sealing surface 114 of the shaft element 24. An outer peripheral surface 220 of the seal carrier 136 preferably faces generally radially outward toward the carrier recess bore 196, and preferably at least part of the seal carrier 136 is located inside the carrier recess bore 196.

Preferably, the seal carrier 136 has a carrier end surface 222 that is planar and faces in a generally axial direction, and preferably faces away from carrier shoulder 216, it being shown that the carrier shoulder 216 and the carrier end surface 222 preferably face in opposite directions.

Preferably, the carrier shoulder 216 faces toward and adjoins the recess shoulder 214 of the ring retainer 134, and preferably the carrier end surface 222 faces toward and adjoins the retaining shoulder 218. In this specification, the definition of the words "adjoin", "adjoins", and "adjoining" includes the commonly accepted "adjoin" definition "to be close to or in contact with one another" that is provided by the Merriam-Webster online dictionary for the word "adjoin". Although this definition is provided herein, this is not an example of the inventors being their own lexicographers, since the definition given is simply the commonly understood definition.

Preferably, the seal carrier 136 incorporates a carrier journal bearing surface 224 that surrounds and faces toward at least a portion of the sealing surface 114 of the shaft element 24. The carrier journal bearing surface 224 is preferably an annular, generally cylindrical surface that establishes a journal-bearing type fit with the sealing surface 114 of the shaft element 24, forcing the seal carrier 136 to move laterally to accommodate any lateral misalignment and dynamic runout of the sealing surface 114 of the shaft element 24. Radial clearance 227 is provided between the outer peripheral surface 220 of the seal carrier 136 and the carrier recess bore 196 of the ring retainer 134, in order to accommodate the lateral movement and misalignment of the seal carrier 136 relative to the ring retainer 134.

Preferably, the seal carrier 136 incorporates a seal groove consisting of a first groove wall 226, a second groove wall 228, and a peripheral groove wall 230 that encircle at least a portion of the sealing surface 114 of the shaft element 24. The first groove wall 226 and second groove wall 228 are preferably generally planar, and preferably face in opposite, generally axial directions, toward one-another, as shown. The peripheral groove wall 230 is an annular, radially inwardly facing surface that faces toward, and is radially spaced from, the sealing surface 114 of the shaft element 24. The peripheral groove wall 230 is preferably cylindrical.

Preferably, a partitioning seal 182 is located at least partially within the seal groove of the seal carrier 136 that is defined by the first groove wall 226, second groove wall 228, and peripheral groove wall 230. The partitioning seal 182 encircles and is in contact with a portion of the sealing surface 114 of the shaft element 24. Preferably, at least part of the partitioning seal 182 is located between the first groove wall 226 and second groove wall 228 of the seal carrier 136. Preferably, at least part of the partitioning seal 182 is located between the peripheral groove wall 230 of the seal carrier 136 and the sealing surface 114 of the shaft element 24. Preferably, the partitioning seal 182 has a dynamic sealing surface 232 of annular form that faces radially inward toward, and contacts the sealing surface 114 of the shaft element 24, establishing sealing contact therewith, retaining the first fluid 33 and the pressure of the first fluid 33. Preferably, the partitioning seal 182 has a static sealing surface 234 of annular form that faces radially outward toward, and contacting, the peripheral groove wall 230 of the seal carrier 136, establishing sealing contact therewith, retaining first fluid 33 and the pressure of the first fluid 33. Preferably, the partitioning seal 182 is squeezed in radial compression between the peripheral groove wall 230 of the seal carrier 136 and the sealing surface 114 of the shaft element 24, establishing sealing contact pressure between the dynamic sealing surface 232 of the partitioning seal 182 and the sealing surface 114 of the shaft element 24, and establishing sealing contact pressure between the static sealing surface 234 of the partitioning seal 182 and the peripheral groove wall 230 of the seal carrier 136.

Preferably, the seal carrier 136 is sealed with respect to the retaining shoulder 218 by the carrier seal 236, which is preferably employed in face sealing fashion, as illustrated, to allow lateral movement of the seal carrier 136. In other words, the carrier seal 236 is axially compressed between the seal carrier 136 and the retaining shoulder 218. Preferably, the carrier seal 236 is positioned in and contacts an annular seal groove 238 that is cut or otherwise formed into the carrier end surface 222 of the seal carrier 136, and the carrier seal 236 is axially compressed between the annular seal groove 238 and the retaining shoulder 218. It can be appreciated, however, that it would be nearly as convenient to cut the annular seal groove into the retaining shoulder 218, and have the carrier seal 236 compressed between that groove and the carrier end surface 222 of the seal carrier 136. The carrier seal 236 is located between the seal carrier 136 and the retaining shoulder 218, and is preferably located radially outward of, and encircling, a portion of the shaft element 24. The carrier seal 236 is preferably located radially inward of, and encircled by, the carrier recess bore 196 of the ring retainer 134. The carrier seal 236 is located between and is exposed to the fluid media 46 and the first fluid 33, and partitions and separates the fluid media 46 from the first fluid 33.

A pressure-retaining seal 180 encircles part of the sealing surface 114 of the shaft element 24, and is preferably located at least partially inside of the annular extension 192 of the backup ring 132. The backup ring 132 is annular, having generally circular form. The annular extension 192 of the backup ring 132 has a gland bore 240 that is located radially outward of, is radially spaced from, encircles, and faces generally toward, the sealing surface 114 of the shaft element 24. Preferably, at least a portion of the sealing surface 114 is located inside the gland bore 240 and therefore inside of and encircled by the annular extension 192 of the backup ring 132, as shown.

Preferably, at least part of the pressure-retaining seal 180 is located between the sealing surface 114 of the shaft element 24 and the gland bore 240 of the backup ring 132. Preferably, the gland bore 240 is located radially outward of, encircles, and faces generally toward, and contacts, at least part of the pressure-retaining seal 180. At least part of the sealing surface 114 of the shaft element 24, and at least part of the pressure-retaining seal 180, are surrounded by the gland bore 240 of the backup ring 132. The rotary seal is preferably retained within the gland bore 240 of the backup ring 132 by a carrier end surface 242 of the seal carrier 136, and by the difference in pressure between the first fluid 33 and the second fluid 34. In essence, the gland bore 240, the inner first ring end 244 of the backup ring 132, and the carrier end surface 242 of the seal carrier 136 form a seal groove that holds and locates the pressure-retaining seal 180, the pressure-retaining seal 180 being preferably located axially between the inner first ring end 244 of the backup ring 132, and the carrier end surface 242 of the seal carrier 136. Preferably, the pressure-retaining seal 180 has a first seal end 264 and a second seal end 246, and preferably at least part of the second seal end 246 is in contact with and supported by the inner first ring end 244 when differential pressure acts across the seal, i.e. when the pressure of the first fluid 33 is greater than the pressure of the second fluid 34.

Preferably, the pressure-retaining seal 180 is held in radial compression between the sealing surface 114 of the shaft element 24 and the gland bore 240 of the backup ring 132, the radial compression causing the pressure-retaining seal 180 to establish sealing contact force with the sealing surface 114 of the shaft element 24, and with the gland bore 240 of the backup ring 132. During rotation or axial movement of the shaft element 24, the sealing surface 114 of the shaft element 24 preferably slips with respect to the pressure-retaining seal 180.

Preferably, the annular extension 192 of the backup ring 132 has an outwardly facing peripheral surface 248 that is located at least partially within the annular receiving recess 194 of the ring retainer 134, the annular receiving recess 194 being larger than, and spaced radially from the outwardly facing peripheral surface 248 of the backup ring 132, allowing the backup ring 132 to be laterally misaligned with respect to the annular receiving recess 194 of the ring retainer 134. Preferably, at least part of the annular extension 192 of the backup ring 132 is located radially inward of, and encircled by, a receiving bore 194 of the ring retainer 134, and preferably, at least part of the annular extension 192 of the backup ring 132 is located radially between the pressure-retaining seal 180 and the receiving bore 194 of the ring retainer 134.

Preferably, the carrier end surface 242 of the seal carrier 136 is located inside of the annular extension 192 of the backup ring 132. Preferably, the carrier end surface 242 of the seal carrier 136 faces toward, and is adjacent to, the pressure-retaining seal 180.

The backup ring 132 has an outer first ring end 250 that is preferably planar, and preferably parallel to the inner first ring end 244, and preferably faces in the same axial direction as inner first ring end 244, as shown.

The ring first end seal 198 is preferably compressed between the backup ring 132 and the ring retainer 134, as shown, partitioning the first fluid 33 from the second fluid 34, and preventing the first fluid 33 from escaping between the retaining shoulder 254 of the ring retainer 134 and the outer first ring end 250 of the backup ring 132 and into the second fluid 34. If desired, the ring first end seal 198 can be located by and at least partially within a first end groove 252 that is cut or otherwise formed into the outer first ring end 250 of the backup ring 132, as shown, such that the ring first end seal 198 is axially compressed between the first end groove 252 of the backup ring 132 and the retaining shoulder 254 of the ring retainer 134. One can appreciate, however, that as an alternative design choice, although somewhat less desirable, the first end groove 252 could be cut into the retaining shoulder 254 of the ring retainer 134, instead of into the outer first ring end 250 of the backup ring 132. Thus, it can be said that the first end groove 252 can be formed on one of the components selected from the group consisting of the backup ring 132 and the ring retainer 134. Preferably, the retaining shoulder 254 of the ring retainer 134 encircles at least part of the externally oriented sealing surface 114 that locates the backup ring 132 laterally.

However configured, the ring first end seal 198 is exposed to and located between the second fluid 34 and the first fluid 33, and partitions the first fluid 33 and the pressure of the first fluid 33 from the second fluid 34 and the pressure of the second fluid 34.

The carrier shoulder 216, the carrier end surface 242 and the carrier end surface 222 of the seal carrier 136, the retaining shoulder 218, the first groove wall 226 and the second groove wall 228 of the seal carrier 136, the recess shoulder 214 and the retaining shoulder 254 of the ring retainer 134, the inner first ring end 244 and outer first ring end 250 of the backup ring 132 are preferably flat surfaces, and preferably substantially parallel to one another.

Preferably, the ring first end seal 198 contacts and establishes sealing between the backup ring 132 and the ring retainer 134, and preferably the ring first end seal 198 is located directly radially outward from and encircles a part of the sealing surface 114 and preferably the ring first end seal 198 is located directly radially outward from and encircles at least part of the pressure-retaining seal 180. Preferably, the first end groove 252 is located radially outward from and encircles the sealing surface 114 and is located radially outward from and encircles at least part of the pressure-retaining seal 180, and is located radially outward from and encircles at least part of the gland bore 240.

Preferably, the backup ring 132 includes a seal installation chamfer 336 to facilitate installation of the pressure-retaining seal 180 into the gland bore 240, and preferably the seal installation chamfer 336 is generally conical in shape and forms an external corner 338 with the gland bore 240, it being understood that the external corner 338 can be a rounded external corner. (External corners are also known as outside corners, and internal corners are also known as inside corners. An example of an external corner would be where two exterior walls join on the outside of a square house. An example of an internal corner would be where two interior walls join in a square room inside of a house.)

Preferably, the seal installation chamfer 336 also forms an external corner with the extension end 268. Preferably, the sealing surface 114 of the shaft element 24 passes completely through the ring retainer 134, and preferably all the ring retainer 134 is larger than the sealing surface 114 of the shaft element 24.

Preferably, at least the part of the sealing surface 114 that is in contact with the pressure-retaining seal 180 is located within the ring retainer 134, and preferably the ring retainer 134 surrounds at least a part of the pressure-retaining seal 180, and surrounds at least part of the annular extension 192 of the backup ring 132, and surrounds at least part of the seal installation chamfer 336. Preferably, no part of the backup ring 132 is located directly axially between the pressure-retaining seal 180 and the seal carrier 136.

FIG. 9

Figure 9:
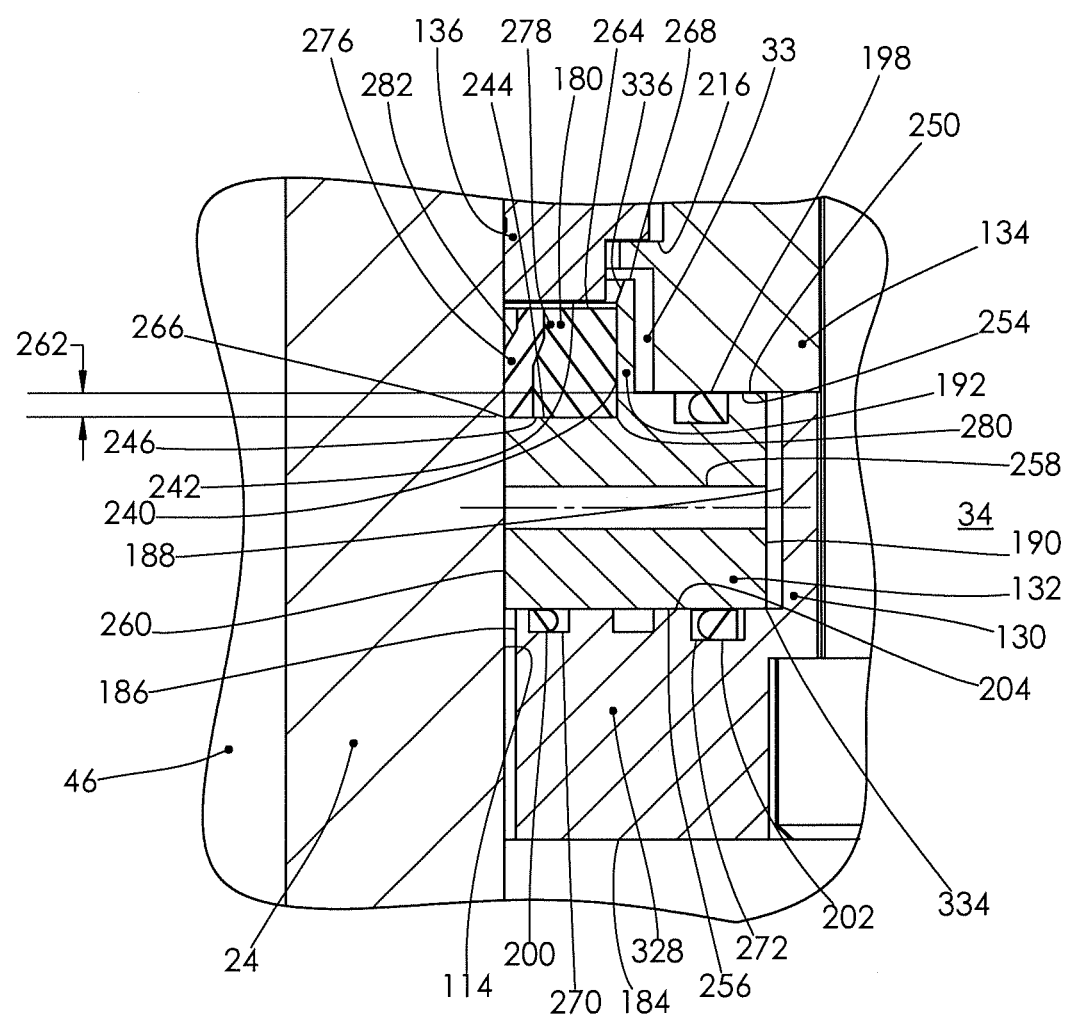

The fragmentary longitudinal cross-sectional view of FIG. 9 is an enlargement of the cross-section included in FIG. 2, to better show some of the interior detail of the sealing assembly 4.

The second ring end 256 of the backup ring 132 is preferably of generally planar form, and preferably faces generally in the opposite direction from the inner first ring end 244 and the outer first ring end 250, and preferably faces toward and adjoins the locating shoulder 204. Preferably, the inner first ring end 244 and the outer first ring end 250 of the backup ring 132 are substantially flat surfaces that are substantially parallel to one another and to the second ring end 256, which is also preferably substantially flat. Preferably, the inner first ring end 244, and the outer first ring end 250 face in the same general axial direction, away from the locating shoulder 204 of the bulkhead housing 130.

Preferably, the ring outer surface 190 of the backup ring 132 and the ring pocket bore 188 of the bulkhead housing 130 are exposed to the second fluid 34 and the pressure of the second fluid 34, which is preferably less than the pressure of the first fluid 33 during operation. One way the pressure of the second fluid 34 may reach the ring outer surface 190 and the ring pocket bore 188 is because there is preferably no seal provided to establish sealing between the bulkhead housing 130 and the ring retainer 134, and the second fluid 34 can pass through the unsealed preferably clamped interface between the bulkhead housing 130 and the ring retainer 134.

If desired, the backup ring 132 may incorporate a generally radially oriented communication hole 258 that communicates the second fluid 34 from a region of radial clearance between the ring inner surface 260 of the backup ring 132 and the sealing surface 114 of shaft element 24 to a region of radial clearance surrounding the ring outer surface 190 of the backup ring 132, and preferably this communication hole 258 communicates the second fluid 34 and the pressure of the second fluid 34 to the ring outer surface 190 of the backup ring 132, and to the surrounding ring pocket bore 188.

In some cases, the pressure of the second fluid 34 is merely atmospheric pressure, or some other negligible gas pressure. In such cases, if desired as a simplification, the atmospheric pressure or other negligible gas pressure can simply be trapped in the region surrounding the ring outer surface 190 of the backup ring 132 at the time of assembly. In such cases, the pressure applied to the ring inner surface 260 is substantially equal to the pressure applied to the ring outer surface 190, even though no pressure communication path has been provided.

Preferably, the axial distance separating the inner first ring end 244 and the second ring end 256 of the backup ring 132 is less than the axial distance separating the outer first ring end 250 from the second ring end 256 of the backup ring 132. This produces a pressure imbalance length 262 where the pressure differential between the first fluid 33 and the second fluid 34 acts radially outward creating a radially outwardly acting hydraulic force that acts on the backup ring 132. This occurs because the pressure of the seal lubricant acts through the polymeric material of the pressure-retaining seal 180. This radially outwardly acting pressure imbalance counteracts the twisting that would otherwise tend to occur as a result of the radial offset between the axial hydraulic loads described below that act on the backup ring 132 from opposite directions. By counteracting this twisting, the dimensional stability of the ring inner surface 260 of the backup ring 132 is improved. As a result, the extrusion gap clearance between the ring inner surface 260 of the backup ring 132 (at the extrusion gap corner 266) and the sealing surface 114 of the backup ring 132 is improved. Typically, the pressure of the fluid media 46 acts on the shaft bore, which can cause radially outward deformation of the shaft element 24, which can cause the sealing surface 114 of the shaft element 24 to have a slightly conical, sloped shape in operation, when not in its relaxed unstressed shape. By carefully engineering the pressure imbalance length 262, the slope of the ring inner surface 260 of the backup ring 132 can be substantially matched to the slope of the sealing surface 114 of the shaft element 24, thereby improving the load bearing capability and performance of the ring inner surface 260 of the backup ring 132 while minimizing the extrusion gap clearance the pressure-retaining seal 180 has to bridge. Preferably, the pressure-retaining seal 180 is exposed to the pressure of the second fluid 34 at the extrusion gap. The pressure-retaining seal 180 must bridge/seal the extrusion gap in order to withstand the differential pressure between the first fluid 33 and the second fluid 34, and to prevent the pressure-driven wholesale loss of the first fluid 33.

Preferably, the inner first ring end 244 of the backup ring 132 faces toward the carrier end surface 242 of the seal carrier 136.

The pressure-retaining seal 180 is of annular form, and preferably its first seal end 264 faces toward the carrier end surface 242 of the seal carrier 136 and is exposed to and contacting the first fluid 33, and preferably its second seal end 246 faces toward the inner first ring end 244 of the backup ring 132, the second seal end 246 preferably contacting, and supported by, the inner first ring end 244 of the backup ring 132. The second seal end 246 and the inner first ring end 244 are preferably located directly radially between the ring outer surface 190 and the shaft element 24, and are preferably encircled by the ring outer surface 190.

The ring inner surface 260 of the backup ring 132 is preferably substantially cylindrical in the relaxed, unloaded state. The ring inner surface 260 of the backup ring 132 faces in a generally radially inward direction toward and encircling the outwardly facing sealing surface 114 of the shaft element 24, establishing a journal bearing relationship therewith, and a region of clearance therewith. Preferably, the clearance between the ring inner surface 260 and the sealing surface 114 is made as small as practicable, considering factors such as tolerances, differential thermal expansion between the ring inner surface 260 of the backup ring 132 and the sealing surface 114 of the shaft element 24 during operation, any pressure-induced outward deformation (pressure breathing) of the shaft element 24, and force imbalance and/or misalignment that may act on the backup ring 132 to cause the diameter of the ring inner surface 260 to change.

Both the inner first ring end 244 and the ring inner surface 260 are preferably located radially outward of, are radially spaced from, and encircle the sealing surface 114 of the shaft element 24, the ring inner surface 260 preferably having an annular shape having a diameter that is larger than the diameter of the annular shape of the sealing surface 114 of the shaft element 24. Preferably, the region where the aforementioned bearing relationship exists is located in intermediate relation with the inner first ring end 244 and the second ring end 256, and is located in intermediate relation with the inner first ring end 244 and the locating shoulder 204, and is located in intermediate relation with the inner first ring end 244 and the inner balancing seal 200. Preferably, the aforementioned region of clearance s is located in intermediate relation with the inner first ring end 244 and the second ring end 256, and is located in intermediate relation with the inner first ring end 244 and the locating shoulder 204, and is located in intermediate relation with the inner first ring end 244 and the inner balancing seal 200. Preferably, no portion of the backup ring 132 is located directly between the inner first ring end 244 and the seal carrier 136.

The ring inner surface 260 and the sealing surface 114 preferably have radial clearance with one another at most circumferential locations; this radial clearance forms what is known in the sealing industry as an extrusion gap at the inner first ring end 244 of the backup ring 132, and the pressure-retaining seal 180 must bridge this extrusion gap. The smaller the extrusion gap, the better the pressure-retaining seal 180 can withstand differential pressure between the first fluid 33 and the second fluid 34.

The inner first ring end 244 of the backup ring 132 preferably extends radially inward from the annular extension 192, and preferably an intersection between the inner first ring end 244 and the ring inner surface 260 forms an extrusion gap corner 266, it being understood in the art that extrusion gap corners are preferably slightly rounded external corners, the typically recommended corner radius being 0.005 inch. The extension end 268 of the annular extension 192 preferably has a generally planar shape that faces in a generally axial direction toward the carrier shoulder 216 of the seal carrier 136. The extension end 268 is preferably located in intermediate location to the pressure-retaining seal 180 and the carrier shoulder 216 of the seal carrier 136. It should be noted, however, that preferably no portion of the backup ring 132 is located directly between the pressure-retaining seal 180 and the carrier end surface 242 of the seal carrier 136.

The outer first ring end 250 of the backup ring 132 preferably faces toward and adjoins the retaining shoulder 254. The ring first end seal 198 contacts, is axially compressed between, and establishes sealing between, the backup ring 132 and the ring retainer 134, partitioning the first fluid 33 and the pressure of the first fluid 33 from the second fluid 34 and the pressure of the second fluid 34.

A portion of the backup ring 132 is preferably located in intermediate relation to the retaining shoulder 254 of the ring retainer 134 and the locating shoulder 204 of the bulkhead housing 130, and this portion of the backup ring 132 is preferably located directly between the retaining shoulder 254 and the locating shoulder 204, and the backup ring 132 is preferably located axially by the retaining shoulder 254 and the locating shoulder 204.

The second ring end 256 of the backup ring 132 faces toward and preferably adjoins the locating shoulder 204 of the bulkhead housing 130. The locating shoulder 204 of the bulkhead housing 130 is preferably generally planar in form and faces in an axial direction, generally toward the retaining shoulder 254 of the ring retainer 134 and generally toward the second ring end 256 of the backup ring 132. The retaining shoulder 254 of the ring retainer 134 preferably faces in an axial direction generally toward the locating shoulder 204 of the bulkhead housing 130, and generally toward the outer first ring end 250 of the backup ring 132.

The retaining shoulder 254 of the ring retainer 134 is axially separated from the locating shoulder 204 of the bulkhead housing 130 by a first axial dimension, and the outer first ring end 250 of the backup ring 132 is separated from the second ring end 256 of the backup ring 132 by a second axial dimension, the first axial dimension being slightly greater than the second axial dimension, leaving the backup ring 132 unclamped axially, and relatively free to move laterally with any lateral motion of the shaft element 24.

The inner balancing seal 200 and the outer balancing seal 202 are preferably located between, and in axially compressed sealed contact with, the backup ring 132 and the bulkhead housing 130. The inner balancing seal 200 and the outer balancing seal 202 retain the first fluid 33 betwixt them, however, the passageway that communicates the first fluid 33 to the region between the inner balancing seal 200 and the outer balancing seal 202 is not shown in FIG. 9. The pressure of the first fluid 33 preferably acts on and through the material of the inner balancing seal 200 and the outer balancing seal 202, as if the materials of the inner balancing seal 200 and the outer balancing seal 202 were fluids.

Preferably, the inner balancing seal 200 is located by and at least partially in, a face-type inner balancing seal groove 270. Preferably, the outer balancing seal 202 is located by and at least partially in, a face-type outer balancing seal groove 272. Preferably, the inner and outer balancing seals 200 and 202 partition the pressure of the first fluid 33 from the pressure of the second fluid 34.

If desired, the inner and outer balancing seal grooves 207 and 272 can be cut or otherwise formed into the locating shoulder 204 of the bulkhead housing 130, as shown, opening toward the backup ring 132. Alternately, as a design choice, the inner and outer balancing seal grooves can be formed into the backup ring 132, opening toward the bulkhead housing 130, although this is somewhat less desirable. Therefore, it can be said that the inner and outer balancing seal grooves 207 and 272 can be formed in a component selected from the group consisting of the bulkhead housing 130 and the backup ring 132.

The inner and outer balancing seals 200 and 202 are located radially outward from, and encircle, the shaft element 24, and preferably encircle the sealing surface 114 of the shaft element 24. Preferably, the outer balancing seal 202 is located radially outward of, is radially spaced from, and encircles the inner balancing seal 200, establishing an annular sealed region there-between.

Preferably, the axial distance separating the inner balancing seal 200 from the inner first ring end 244 of the backup ring 132 and from the pressure-retaining seal 180 is less than the axial distance separating the second ring end 256 of the backup ring 132 from the outer first ring end 250 of the backup ring 132. Preferably, the axial distance separating the second ring end 256 of the backup ring 132 from the inner first ring end 244 of the backup ring 132 and from the pressure-retaining seal 180 is less than the axial distance separating the outer balancing seal 202 from the outer first ring end 250 of the backup ring 132.

The pressure-retaining seal 180 preferably has a plastic layer 276 that contacts the sealing surface 114 of the shaft element 24 and contacts the inner first ring end 244 of the backup ring 132 and bridges the extrusion gap clearance between the ring inner surface 260 of the backup ring 132 and the sealing surface 114 of the shaft element 24 preventing gross leakage and loss of the first fluid 33. This plastic layer stiffens the pressure-retaining seal 180, making it difficult to install within the gland bore 240 unless the seal installation chamfer 336 is present. This is why the seal installation chamfer 336 is preferred to be present as part of the backup ring 132.

As can be seen in FIG. 9, the gland bore 240 has first and second axial extremities, the first axial extremity being axially distant from the gland inside corner 280 and the first axial extremity preferably being at the intersection between the gland bore 240 and the seal installation chamfer, and the second axial extremity being at the gland inside corner 280, the axial extent of the gland bore 240 being located between the first and second axial extremities of the gland bore 240. The outer first ring end 250 and the retaining shoulder 254 are preferably located axially in intermediate relation to the first and second axial extremities of the gland bore 240.

As can be seen in FIG. 9, the annular extension 192 also has first and second axial extremities, the first axial extremity being axially distant from the outer first ring end 250 and the second axial extremity adjoining the outer first ring end 250 at an intersection therewith forming an inside corner. The gland inside corner 280, the inner first ring end 244, and the extrusion gap corner 266 are preferably located in axially intermediate relation to the second axial extremity of the annular extension 192 and the second ring end 256.

The pressure-retaining seal 180 bridges the extrusion gap clearance between the ring inner surface 260 of the backup ring 132 and the sealing surface 114 of the shaft element 24, preventing gross leakage and loss of the first fluid 33, whether or not the pressure-retaining seal 180 has a plastic layer 276. In other words, the pressure-retaining seal 180 seals the extrusion gap between the ring inner surface 260 and the sealing surface 114 of the shaft element 24, retaining the pressure of the first fluid 33.

The pressure-retaining seal 180 preferably also has an elastomer layer 278 that contacts the gland bore 240 and the inner first ring end 244 of the backup ring 132. It should be noted that the second seal end 246 of the pressure-retaining seal 180 that faces and contacts the inner first ring end 244 of the backup ring 132 is closer to the locating shoulder 204 of the bulkhead housing 130, compared to the first seal end 264 of the pressure-retaining seal 180 that faces toward the carrier shoulder 216 of the seal carrier 136.

The minimum axial distance between the pressure-retaining seal 180 and the locating shoulder 204 is preferably less than the minimum axial distance between the ring first end seal 198 and the locating shoulder 204.

The gland inside corner 280 is preferably located between the gland bore 240 and the inner first ring end 244, in the form of an inside corner and preferably a 90 degree inside corner, it being understood that such corners are often slightly rounded (i.e. filleted) from manufacturing operations, and may therefore be referred to as rounded or filleted inside corners. Preferably, the axial distance between the gland inside corner 280 and the locating shoulder 204 is less than the axial distance between the retaining shoulder 254 and the locating shoulder 204, and is preferably less than the axial distance between the outer first ring end 250 and the second ring end 256.

The pressure-retaining seal 180 preferably has a fluid facing surface 282 that is exposed to and contacted by the first fluid 33 and is sloped relative to the sealing surface 114 of the shaft element 24, providing and having gradual convergence with the sealing surface 114, and the a fluid facing surface 282 preferably varies in axial location around the circumference of the pressure-retaining seal 180, thus forming a seal hydrodynamic inlet that produces a controlled pumping action that forces a very thin lubricating film of the first fluid 33 between the pressure-retaining seal 180 and the sealing surface 114 of the shaft element 24 during periods of relative rotation between the pressure-retaining seal 180 and the sealing surface 114 in accordance with the principles described in the above-referenced rotary seal patents, and preferably a portion of this lubricating film escapes in a controlled manner into the clearance between the ring inner surface 260 of the backup ring 132 and the sealing surface 114 of the shaft element 24, establishing a lubricating film between the ring inner surface 260 of the backup ring 132 and the sealing surface 114 of the shaft element 24, thereby minimizing wear of the ring inner surface 260 of the backup ring 132 and minimizing wear of the sealing surface 114 of the shaft element 24.

By virtue of this hydrodynamic pumping action of the pressure-retaining seal 180, the portion of the thin lubricating film that enters the clearance region between the ring inner surface 260 of the backup ring 132 and the sealing surface 114 of the shaft element 24 thus becomes a part of the second fluid 34, and in becoming a part of the second fluid 34, acquires the pressure of second fluid 34 it is now part of Preferably, the ring inner surface 260 of the backup ring 132 is in tangential contact with the sealing surface 114 of the shaft element 24, forming a circumferentially gradually converging hydrodynamic bearing inlet. In other words, the ring inner surface 260 establishes a journal bearing relationship with the sealing surface 114, locating the backup ring 132 laterally.

Preferably the ring inner surface 260, the hydrodynamic bearing inlet, and the journal bearing relationship are located in axially intermediate relation to the pressure-retaining seal 180 and the locating shoulder 204 of the bulkhead housing 130, and are located in axially intermediate relation to the pressure-retaining seal 180 and the inner balancing seal 200, and are located in axially intermediate relation to the pressure-retaining seal 180 and the outer balancing seal 202, and are located in axially intermediate relation to the inner first ring end 244 and the second ring end 256, and are located in axially intermediate relation to the pressure-retaining seal 180 and the second ring end 256. In other words, in the order of the features, the pressure-retaining seal 180 comes first, the ring inner surface 260 comes second, and the second ring end 256 comes third.

The backup ring 132 has a radial thickness between the ring inner surface 260 and the ring outer surface 190, and the communication hole 258 preferably passes completely though this radial thickness. Preferably, the communication hole 258 is located between, and axially spaced from, the outer first ring end 250 and the second ring end 256 of the backup ring 132, and is located between and axially spaced from the ring first end seal 198 and the outer balancing seal 202, and is located between and axially spaced from the retaining shoulder 254 of the ring retainer 134 and the locating shoulder 204 of the bulkhead housing 130, and is located between and axially spaced from the inner first ring end 244 and the second ring end 256, and is located between and axially spaced from the pressure-retaining seal 180 and the second ring end 256. The communication hole 258 has first and second oppositely facing open ends, the first open end facing generally radially inward toward the sealing surface 114 of the shaft element 24, and the second open end being located generally radially outward of the first open end and facing generally radially outward and away from the sealing surface 114 of the shaft element 24.

The inner and outer balancing seals 200 and 202 and the ring first end seal 198 partition the first fluid 33 from the second fluid 34, and partition the pressure of the first fluid 33 from the pressure of the second fluid 34.

Both the ring inner surface 260 and the ring outer surface 190 of the backup ring 132 are exposed to and contacted by the second fluid 34, and the pressure of the second fluid 34, enabling the backup ring 132 to be approximately radially pressure balanced, and therefore relatively immune to pressure related radial deformation. The region of radial clearance between the ring inner surface 260 of the backup ring 132 and the sealing surface 114 of shaft element 24 forms what is in the sealing industry commonly called an "extrusion gap" at the inner first ring end 244, and the first fluid 33 is prevented from freely passing through this extrusion gap by the pressure-retaining seal 180.

Preferably, all of the ring retainer 134 is larger than the sealing surface 114 of the shaft element 24, and the sealing surface 114 may pass completely through the ring retainer 134 axially. The sealing surface 114 of the shaft element 24 preferably passes completely through the ring inner surface 260 of the backup ring 132, and preferably passes completely through the backup ring 132 from the extension end 268 to the second ring end 256, the second ring end 256 preferably being located radially outward of and encircling the sealing surface 114, and the sealing surface 114 preferably enters at least a portion of the shaft passageway 186 of the bulkhead housing 130, and may pass completely through the shaft passageway 186, as shown, the shaft passageway 186 preferably being larger than and located radially outward from the shaft sealing surface 114 and preferably encircling at least part of the shaft sealing surface 114, and preferably all of the bulkhead housing 130 is larger than, and located radially outward from, the shaft sealing surface 114.

The ring inner surface 260 of the backup ring 132 is preferably located closer to the sealing surface 114, compared to the shaft passageway 186, and preferably, no part of the bulkhead housing 130 is closer to the sealing surface 114 of the shaft element 24, compared to the ring inner surface 260 of the backup ring 132. Preferably, the ring inner surface 260 has a diameter and the shaft passageway 186 has a diameter, and preferably the diameter of the ring inner surface 260 is smaller than the diameter of the shaft passageway 186. Preferably, the bulkhead housing 130 has several surfaces forming diameters, and preferably the diameter of the shaft passageway 186 is the smallest of the diameters formed by the several surfaces of the bulkhead housing 130. Preferably, the sealing surface 114 of the shaft element 24 passes completely through the bulkhead housing 130, as shown.

The ring outer surface 190 of the backup ring 132 is preferably located radially outward of the ring inner surface 260, and the radial distance from the ring outer surface 190 to the sealing surface 114 of the shaft element 24 is greater than the radial distance from the shaft passageway 186 to the shaft sealing surface 114.

The inner and outer balancing seals 200 and 202 are each exposed to, contacted by, and located between the second fluid 34 and the first fluid 33, and each of the inner and outer balancing seals 200 and 202 prevents the first fluid 33 from escaping into the second fluid 34, and seals the second fluid 34 from the first fluid 33. The outer balancing seal 202 is more radially distant from the shaft element 24, compared to the inner balancing seal 200 and compared to the ring first end seal 198, and the outer balancing seal 202 preferably encircles the inner balancing seal, as shown. The inner and outer balancing seals 200 and 202 are axially separated from the ring first end seal 198, and do not contact the outer first ring end 250. Preferably, no portion of the ring outer surface 190 of the backup ring 132, and no portion of the ring inner surface 260 of the backup ring 132, is exposed to the pressure of the first fluid 33.

Operationally, the pressure-retaining seal 180 and the ring first end seal 198 define a first hydraulic area that is acted on by the pressure of the first fluid 33, producing a first axially acting hydraulic force acting on the backup ring 132 in a first axial direction toward the locating shoulder 204 of the bulkhead housing 130, and the inner and outer balancing seals 200 and 202 define a second hydraulic area that is acted on by the pressure of the first fluid 33, producing a second axially acting hydraulic force acting on the on the backup ring 132 in a second axial direction, toward the retaining shoulder 254 of the ring retainer 134 and toward the seal carrier 136, the first and second axial directions being opposite. The second hydraulic area is typically located farther from the sealing surface 114, compared to the first hydraulic area, which means that the first and second axially acting forces are typically radially misaligned. This radial misalignment tends to torsionally twist the backup ring, and tends to cause the ring inner surface 260 to become slightly conical in service, even though it is preferably cylindrical in its relaxed, unstressed state. This coning effect related to the radial offset of the oppositely acting hydraulic forces is addressed, as described above, by having the axial distance between the inner first ring end 244 and the second ring end 256 be less than the axial distance between the outer first ring end 250 and the second ring end 256, so that some of the pressure of the first fluid 33 acts in a radially outward direction on the backup ring 132.

Figure 10:
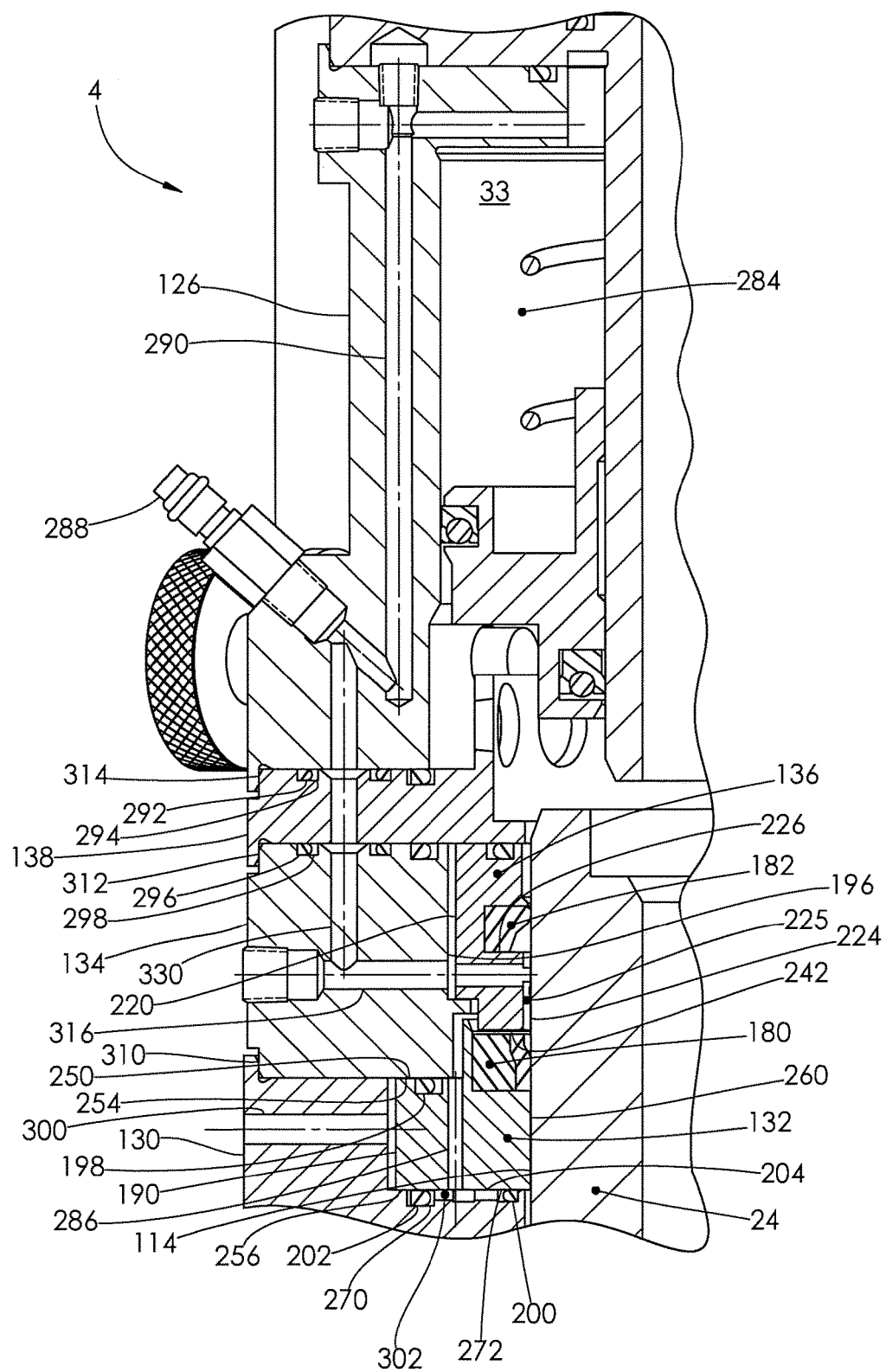
FIG. 10 is a fragmentary longitudinal cross-sectional view of the same sealing assembly that is shown in FIG. 1, but the view is taken at a different cutting plane angle than the views shown in FIGS. 2 to 9.

Preferably, by making the first and second hydraulic areas substantially equal, the first and second axially acting hydraulic forces are substantially equal, and substantially cancel one another out, leaving the backup ring 132 substantially axially force balanced, and therefore free to move laterally with any lateral motion of the sealing surface 114 of the shaft element 24, the backup ring 132 being positioned laterally with respect to the sealing surface 114 of the shaft element 24 by contact between the ring inner surface 260 of the backup ring 132 and the sealing surface 114 of the shaft element 24. (Preferably, the first fluid 33 and the pressure of the first fluid 33 is conducted to the second hydraulic area by the fluid communication passageway 286 that is shown in FIG. 10.)

Preferably, no portion of the pressure-retaining seal 180 is located directly between the inner first ring end 244 and the second ring end 256 of the backup ring 132. Preferably, no portion of the backup ring 132 is smaller than the sealing surface 114 of the shaft element 24.

Preferably, the bulkhead housing 130 has at least one inwardly projecting annular structure 328 between the locating shoulder 204 and the bulkhead end surface 184 having axial thickness between the locating shoulder 204 and the bulkhead end surface 184, and preferably no inwardly projecting annular structure of the bulkhead housing 130 is interposed between the outer first ring end 250 of the backup ring 132 and the retaining shoulder 254 of the ring retainer 134, and preferably, no inwardly projecting annular structure of the bulkhead housing 130 is interposed between the second ring end 256 of the backup ring 132 and the locating shoulder 204 of the bulkhead housing 130, and preferably, no inwardly projecting annular structure of the bulkhead housing 130 is interposed between the second ring end 256 of the backup ring 132 and the inwardly projecting annular structure 328 of the bulkhead housing 130.

Preferably, a portion of the second ring end 256 of the backup ring 132 that is located radially inward of the inner balancing seal 200 is exposed to the second fluid 34 and the pressure of the second fluid 34, and preferably, a portion of the second ring end 256 that is radially outward of the inner balancing seal 200 and radially inward of the outer balancing seal 202 is exposed to the first fluid 33 and the pressure of the first fluid 33, and preferably, a portion of the second ring end 256 that is located radially outward of the outer balancing seal 202 is exposed to the second fluid 34 and the pressure of the second fluid 34, and preferably, a portion of the bulkhead housing 130 radially inward of the inner balancing seal 200 is exposed to the second fluid 34 and the pressure of the second fluid 34, and preferably, a portion of the bulkhead housing 130 that is located radially outward of the inner balancing seal 200 and radially inward of the outer balancing seal 202 is exposed to the first fluid 33 and the pressure of the first fluid 33, and preferably a portion of the bulkhead housing 130 that is located radially outward of the outer balancing seal 202 is exposed to the second fluid 34 and the pressure of the second fluid 34.

Preferably, the bulkhead housing 130 has several surfaces of annular form, one of them being the shaft passageway 186, and preferably the shaft passageway 186 is closer to the shaft element 24 than the several other surfaces, and is exposed to the second fluid 34 and the pressure of the second fluid 34.

Preferably, the ring first end seal 198 is radially closer the sealing surface 114 compared to the outer balancing seal 202, and encircles part of the sealing surface 114.

Preferably, the retaining shoulder 254 of the ring retainer 134 adjoins the outer first ring end 250 of the backup ring 132 and preferably, the locating shoulder 204 of the bulkhead housing 130 adjoins the backup ring 132 at the second ring end 256 thereof.

Preferably, a planar interface is present between the retaining shoulder 254 of the ring retainer 134 and the adjoining outer first ring end 250 of the backup ring 132, and preferably the planar interface is sealed by the ring first end seal 198, and preferably, the planar interface, the retaining shoulder 254, and the outer first ring end 250 are located directly radially outward of the pressure-retaining seal 180.

Preferably, no portion of the bulkhead housing 130 is located directly between the second ring end 256 and the locating shoulder 204, and preferably, no portion of the bulkhead housing 130 is located directly between the outer first ring end 250 and the retaining shoulder 254.

Preferably, the backup ring 132 is located inside a component selected from a group consisting of the ring retainer 134 and the bulkhead housing 130. Preferably, the locating shoulder 204 faces in a generally axial direction toward the retaining shoulder 254.

The second fluid 34 is located radially outward from and contacts ring first end seal 198, and the first fluid 33 is located radially inward from and contacts ring first end seal 198, therefore radially outward of the ring first end seal 198 the retaining shoulder 254 of the ring retainer 134 is contacted by the second fluid 34 and exposed to the pressure of the second fluid 34, and radially inward of the ring first end seal 198 the retaining shoulder 254 of the ring retainer 134 is contacted by the first fluid 33 and exposed to the pressure of the first fluid 33. Thus, it can be said that, preferably, the ring retainer 134 is exposed to the second fluid 34 and the pressure of the second fluid 34, and is exposed to the first fluid 33 and the pressure of the first fluid 33.

Preferably, at least a portion of the sealing surface 114 of the shaft element 24 that locates the backup ring 132 laterally is located within and surrounded by at least a portion of the retaining shoulder 254, such that at least a portion of the retaining shoulder 254 encircles a portion of the sealing surface 114.

Preferably, the outer peripheral edge 334 the second ring end 256 of the backup ring 132 is spaced from the shaft element 24 by a radial distance, and preferably the outer balancing seal groove 272 is spaced from the shaft element 24 by a radial distance, and preferably the inner balancing seal groove 270 is spaced from the shaft element 24 by a radial distance and preferably, the radial distance spacing the outer peripheral edge 334 from the shaft element 24 is greater than the radial distance spacing the outer balancing seal groove 272 from the shaft element 24, and preferably the radial distance spacing the outer balancing seal groove 272 from the shaft element 24 is greater than the radial distance spacing the inner balancing seal groove 270 from the shaft element 24.

Preferably, all of the backup ring 132 is larger than, located directly radially outward from, and encircles a portion of the sealing surface 114 of the shaft element 24. Preferably, at least part of the second ring end 256 and at least part of the pressure-retaining seal 180 are exposed to the first fluid 33 and the pressure of the first fluid 33. Preferably, no portion of the backup ring extends axially beyond the sealing surface 114 of the shaft element 24.

The backup ring 132 is positioned in supporting engagement with the pressure-retaining seal 180, and is interposed between the pressure-retaining seal 180 and the locating shoulder 204 of the bulkhead housing 130.

FIG. 10

The fragmentary longitudinal cross-sectional view of FIG. 10 is a view of the same sealing assembly that is shown in FIG. 1, but it is taken at a different cutting plane angle than the views shown in FIGS. 2 to 9.

Preferably, the first fluid 33 is introduced into the sealing assembly via a quick connect coupling 288 that communicates with the fluid reservoir 284 via a fluid passage 290. If desired, the fluid passage 290 can be a cross-drilled hole arrangement, as shown. If desired, the same cross-drilled hole arrangement forming the fluid passage 290 can be used to communicate the first fluid 33 from the fluid reservoir 284 to the region between pressure-retaining seal 180 and partitioning seal 182. As with many cross-drilled holes of the prior art, the cross-drilled hole that is included as part of the fluid passage 290 may conveniently be sealed by a plug of any suitable type, such as a weld plug, or the threaded plug that is shown, or a press fit plug, etc.

Preferably, the location where the fluid passage 290 passes from the machine housing 126 to the carrier retainer 138 is sealed with a small local O-ring 292 of face-sealing configuration that is mounted in a face-seal type groove 294. Preferably, the location where the fluid passage 290 passes from the carrier retainer 138 to the ring retainer 134 is sealed with a small local O-ring 296 of face-sealing configuration that is mounted in a face-seal type groove 298.

Preferably, a fluid communication passageway 286 passes through the backup ring 132 in a generally axial direction from the outer first ring end 250 to the second ring end 256, and has two open ends facing in generally opposite directions, one open end preferably facing generally away from the bulkhead housing 130 and toward the seal carrier 136, and the other open end preferably facing generally toward the bulkhead housing 130 and away from the seal carrier 136, and opening into the annular sealed region that is located radially between and established by the inner and outer balancing seals 200 and 202, the fluid communication passageway 286 preferably containing and communicating the first fluid 33 and its pressure to the aforesaid annular sealed region, the annular sealed region being exposed to the first fluid 33 and the pressure of the first fluid 33. Preferably, one open end of the fluid communication passageway 286 is located radially between and in intermediate relation to the annular extension 192 and the first end groove 252 of the backup ring 132, and between the annular extension 192 and the ring outer surface 190. Preferably, one open end of the fluid communication passageway 286 is located in radially intermediate relation to the inner and outer balancing seals 200 and 202 and faces and opens generally toward the locating shoulder 204 of the bulkhead housing 130, the open end separated from the shaft element 24 by a radial distance, the radial distance separating the opening from the shaft element 24 is greater than the radial distance separating the inner balancing seal from the shaft element 24 and is less than the radial distance separating the outer balancing seal 202 from the shaft element 24. Preferably, the fluid communication passageway 286 is located in intermediate relation to the outer first ring end 250 and the second ring end 256.

The inner balancing seal 200 is separated from the shaft element 24 by a radial distance and the outer balancing seal 202 is separated from the shaft element 24 by a radial distance, and the fluid communication passageway 286 is and separated from the shaft element 24 by a radial distance, the radial distance separating the fluid communication passageway 286 from the shaft element 24 being greater than the radial distance separating the inner balancing seal 200 from the shaft element 24 and being less than the radial distance separating the outer balancing seal 202 from the shaft element 24.

From the foregoing description, it can be appreciated that the bulkhead housing 130 has annular form, and a portion of the bulkhead housing 130 is exposed to and contacted by the first fluid 33 and the pressure of the first fluid 33, and portions of the bulkhead housing 130 are exposed to and contacted by the second fluid 34, where the pressure of the second fluid 34 is preferably less than the pressure of the first fluid 33 during service. It can also be appreciated that portions of the backup ring 132 are exposed to and contacted by the first fluid 33 and the pressure of the first fluid 33, and portions of the backup ring 132 are exposed to and contacted by the second fluid 34.

The fluid communication passageway 286 is preferably located in intermediate relation to the inner and outer balancing seals 200 and 202, and between the ring inner surface 260 and the ring outer surface 190, and is preferably generally axially oriented, as shown. The fluid communication passageway 286 is preferably located radially more distant from the sealing surface 114 of the shaft element 24, compared to the radial distances that separate the annular extension 192 of the backup ring 132 and the inner balancing seal 200 from the sealing surface 114 of the shaft element 24. The fluid communication passageway 286 is preferably located radially less distant from the sealing surface 114, compared to the radial distances that separate the ring first end seal 198 and the outer balancing seal 202 from the sealing surface 114.

Preferably, at least a portion of the backup ring 132 is located inside the bulkhead housing 130, as shown, and preferably at least a portion of the backup ring 132 is located inside the ring retainer 134.

Preferably, the bulkhead housing 130 has a pressure communication hole 300 that communicates the second fluid 34 to the region of radial clearance surrounding the ring outer surface 190 of the backup ring 132, and communicates the second fluid 34 and the pressure of the second fluid 34 to the ring outer surface 190 of the backup ring 132.

The ring outer surface 190 of the backup ring 132 preferably faces in a generally radially outward direction away from the shaft element 24, and in a generally opposite direction than that of the ring inner surface 260, and may be a generally cylindrical surface. At least a portion of the ring outer surface 190 of the backup ring 132 is preferably located between and in intermediate relation to the locating shoulder 204 of the bulkhead housing 130 and the retaining shoulder 254 of the ring retainer 134.

If desired, the fluid communication passageway 286 can open into a generally radially oriented oil slot 302 that contains the first fluid 33, and communicates the first fluid 33 to the inner balancing seal groove 270 and the outer balancing seal groove 272. If desired, more than one fluid communication passageway 286 can be provided around the circumference of the backup ring 132.

Preferably, the bulkhead housing 130 is closely fitted with the ring retainer 134 at a bulkhead pilot 310 that is formed by mating overlapping inner and outer pilot surfaces. Preferably, the ring retainer 134 is closely fitted with the carrier retainer 138 at a retainer pilot 312 that is formed by mating overlapping inner and outer pilot surfaces. Preferably, the carrier retainer 138 is closely fitted with the machine housing 126 at a housing pilot 314 that is formed by mating overlapping inner and outer pilot surfaces. Preferably, the overlapping lengths of the housing pilot 314, the retainer pilot 312, and the housing pilot 314 are short, to prevent binding during assembly.

Preferably the cross-drilled hole arrangement of the sealing assembly 4 includes a retainer port 316 that penetrates in a generally radial direction from to the carrier recess bore 196, forming an opening in the carrier recess bore 196, and communicating the first fluid 33 between the carrier recess bore 196 and the outer peripheral surface 220 of the seal carrier 136, so that the carrier recess bore 196 and the outer peripheral surface 220 are exposed to and contacted by the first fluid 33. Preferably, the seal carrier 136 incorporates a generally radially oriented lube port 318 that communicates the first fluid 33 to the sealed region that is present between the pressure-retaining seal 180 and the partitioning seal 182. Preferably the lube port 318 extends between the outer peripheral surface 220 of the seal carrier 136 and the carrier journal bearing surface 224 of the seal carrier 136 and communicates the first fluid 33 to the clearance between the carrier journal bearing surface 224 of the seal carrier 136 and the sealing surface 114 of the shaft element 24. Preferably, the seal carrier 136 also includes a pressure communication slot 225 that forms an opening in the first groove wall 226 of the seal carrier 136 to rapidly communicate the first fluid 33 and the pressure of the first fluid 33 to the partitioning seal 182. If desired, the pressure communication slot 225 may also form an opening in the carrier end surface 242 of the seal carrier 136 to communicate the first fluid 33 to the pressure-retaining seal 180.

Preferably, none of the ring inner surface 260 of the backup ring 132 is exposed to the pressure of the first fluid 33, and preferably all of the ring inner surface 260 is exposed to the pressure of the second fluid 34.

Preferably, the ring inner surface 260 has at least one diametric dimension and the sealing surface 114 of the shaft element 24 has a diameter, and preferably no diametric dimension of the ring inner surface 260 is smaller than the diameter of the sealing surface 114.

The fluid communication passageway 286 preferably communicates the first fluid 33 and its pressure to the above-described second hydraulic area, at least some of the first fluid 33 being located between the inner and outer balancing seals 200 and 202, at least some of the second hydraulic area exposed to the first fluid 33, the inner and outer balancing seals 200 and 202 each located between and exposed to the second fluid 34 and each sealing the first fluid 33 from the second fluid 34.

Preferably, the ring retainer 134 has a generally axially oriented fluid communication hole 330 forming part of the cross-drilled hole arrangement, and preferably the fluid communication hole 330 is located directly radially outward of the partitioning seal 182.

FIG. 11

Figure 11:
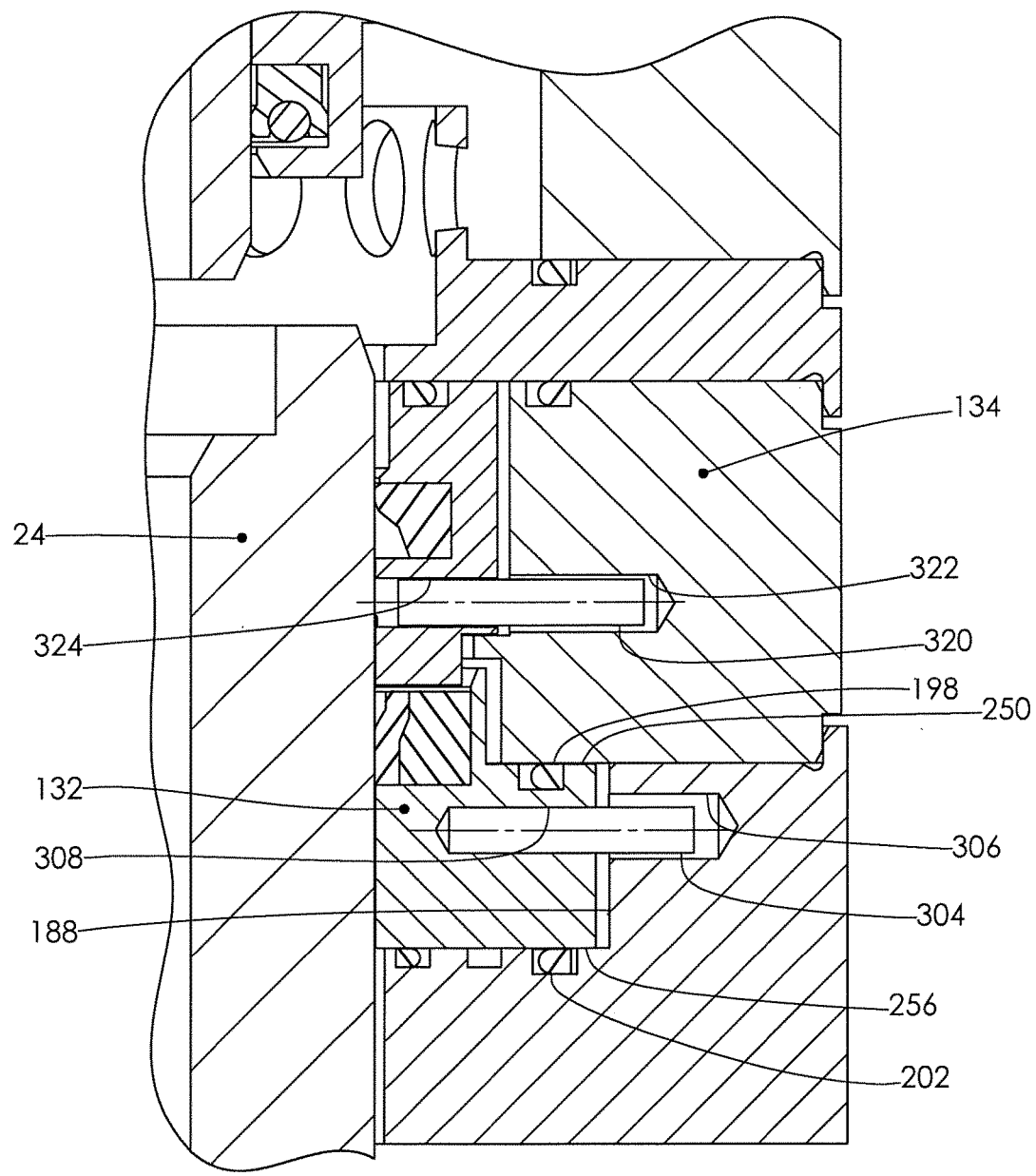
FIG. 11 is a fragmentary longitudinal cross-sectional view of the same sealing assembly that is shown in FIG. 1, but the view is taken at a different cutting plane angle than the views shown in FIGS. 2 to 10.

The fragmentary longitudinal cross-sectional view of FIG. 11 is a view of the same sealing assembly that is shown in FIG. 1, but it is taken at a different cutting plane angle than the views shown in FIGS. 2, 3, and 5 to 10.

A ring anti-rotation pin 304 preferably engages a first pin recess 306 that is formed in the ring pocket bore 188, and preferably engages a that is formed in the backup ring 132. The purpose of the ring anti-rotation pin 304 is to prevent the backup ring 132 from rotating with the shaft element 24. The second pin recess 308 is preferably a generally radially oriented hole that is located between the ring first end seal 198 and the outer balancing seal 202 and between the outer first ring end 250 and the second ring end 256.

A carrier anti-rotation pin 320 preferably engages a mating anti-rotation pocket 322 that is formed in the ring retainer 134, and an anti-rotation pocket 324 that is formed in the seal carrier 136. The purpose of the carrier anti-rotation pin 320 is to prevent the seal carrier 136 from rotating with the shaft element 24.

NOMENCLATURE LIST swivel assembly 2
sealing assembly 4
first conduit 6
second conduit 8
bearing housing 10
conduit support frame 12
frame bolts 16
conduit bolts 18
first retaining collar 20
slot 21
rim 22
shaft element 24
second retaining collar 26
bearing 28
shaft bore 30
bolts 32
first fluid 33
second fluid 34
passageway 38
passageway 40
open end 42
open end 44
fluid media 46
first end 48
Second end 50
bolt flange 52
bolt flange 54
mounting surface 56
external threads 58
internal threads 60
static conduit seal 62
face-type groove 64
end surface 66
mating surface 68
rim surface 70
slot surface 72
spanner wrench holes 74
internal pilot surface 76
external pilot surface 78
external pilot surface 80
internal pilot surface 82
groove outer diameter 83
open end 84
opening width 86
opening height 88
collar exterior surface 90
hammer lugs 92
axially facing surface 94
axially facing end surface 96
radially inwardly facing pilot surface 98
radially outwardly facing pilot surface 100
internal threads 102
external threads 104
washpipe rim 106
clamping shoulder 108
stiffening shoulder 110
lifting groove 112
sealing surface 114 sealing diameter 116
static washpipe seal 118
washpipe seal groove 120
groove outer diameter 122
hydraulic force direction 124
machine housing 126
piston 128
bulkhead housing 130
backup ring 132
ring retainer 134
seal carrier 136
carrier retainer 138
piston guide 140
threaded fastener 142
inner sliding seal 144
outer sliding seal 146
inner seal groove 148
outer seal groove 150
guide surface 152
housing bore 154
guide seal 158
radially extending flange 160
through-passageway 162
guide seal groove 164
bore surface 166
first piston end 168
second piston end 170
helical spring 172
spring recess 174
spring pilot 176
internal reservoir shoulder 178
pressure-retaining seal 180
partitioning seal 182
bulkhead end surface 184
shaft passageway 186
ring pocket bore 188
ring outer surface 190
annular extension 192
annular receiving recess 194
carrier recess bore 196
ring first end seal 198
inner balancing seal 200
outer balancing seal 202
locating shoulder 204
guide recess surface 206A
guide recess surface 206B
piston recess bore 208
retainer seal 210
theoretical axis 211
retainer seal groove 212
recess shoulder 214
carrier shoulder 216
retaining shoulder 218
outer peripheral surface 220
carrier end surface 222
carrier journal bearing surface 224
pressure communication slot 225
first groove wall 226
Radial clearance 227
second groove wall 228
peripheral groove wall 230
dynamic sealing surface 232
static sealing surface 234
carrier seal 236
annular seal groove 238
gland bore 240
carrier end surface 242
inner first ring end 244
second seal end 246
peripheral surface 248
outer first ring end 250
first end groove 252
retaining shoulder 254
second ring end 256
communication hole 258
ring inner surface 260
pressure imbalance length 262
first seal end 264
extrusion gap corner 266
extension end 268
inner balancing seal groove 270
outer balancing seal groove 272
housing seal 274
plastic layer 276
elastomer layer 278
gland inside corner 280
fluid facing surface 282
fluid reservoir 284
fluid communication passageway 286
quick connect coupling 288
fluid passage 290
local O-ring 292
face-seal type groove 294
local O-ring 296
face-seal type groove 298
pressure communication hole 300
oil slot 302
ring anti-rotation pin 304
first pin recess 306
second pin recess 308
bulkhead pilot 310
retainer pilot 312
housing pilot 314
retainer port 316
lube port 318
carrier anti-rotation pin 320
anti-rotation pocket 322
anti-rotation pocket 324
axially facing shoulder 326
inwardly projecting annular structure 328
fluid communication hole 330
retainer innermost surface 332
outer peripheral edge 334
seal installation chamfer 336
external corner 338

CONCLUSION

In view of the foregoing it is evident that the embodiments of the present invention are adapted to attain some or all of the aspects and features hereinabove set forth, together with other aspects and features which are inherent in the apparatus disclosed herein.

Even though several specific geometries are disclosed in detail herein, many other geometrical variations employing the basic principles and teachings of this invention are possible. The foregoing disclosure and description of the invention are illustrative and explanatory thereof, and various changes in the size, shape and materials, as well as in the details of the illustrated construction, may be made without departing from the spirit of the invention. The present embodiments are, therefore, to be considered as merely illustrative and not restrictive, the scope of the invention being indicated by the claims rather than the foregoing description, and all changes which come within the meaning and range of equivalence of the claims are therefore intended to be embraced therein.

We claim:

1. A sealing assembly comprising:
a bulkhead housing having a locating shoulder facing in a generally axial direction;
a first fluid having a first fluid pressure and a second fluid having a second fluid pressure;
a shaft element defining an externally-oriented sealing surface of generally cylindrical form, at least part of said shaft element being located at least partially within and encircled by said bulkhead housing, and being relatively movable with respect to said bulkhead housing;
a ring retainer located radially outward of and surrounding at least a portion of said sealing surface of said shaft element and defining a retaining shoulder facing in a generally axial direction toward said locating shoulder of said bulkhead housing, said locating shoulder of said bulkhead housing facing generally toward said retaining shoulder;
a backup ring of generally circular form positioned axially by said retaining shoulder of said ring retainer and said locating shoulder of said bulkhead housing, said backup ring having an outer first ring end with at least a portion thereof facing in a generally axial direction toward and adjoining said retaining shoulder, and having a second ring end with at least a portion thereof facing in a generally axial direction toward and adjoining said locating shoulder, said outer first ring end and said second ring end facing in generally opposite directions and said retaining shoulder facing in a generally axial direction toward said outer first ring end;
an annular extension protruding axially from said backup ring at a location radially inward of said outer first ring end, a surface of said annular extension forming at least part of a gland bore facing radially inward toward, encircling, and separated radially from said sealing surface, at least a portion of said annular extension being located within and encircled by said ring retainer and at least part of said annular extension being located within and encircled by said retaining shoulder;
an inner first ring end of said backup ring being located in radially intermediate relation to said annular extension and said sealing surface of said shaft element and being located radially outward of and encircling a portion of said sealing surface, said inner first ring end being located in axially intermediate location to said outer first ring end and said second ring end, said inner first ring end facing in a generally axial direction away from said second ring end, said inner first ring end and said outer first ring end facing away from said locating shoulder;
a ring inner surface of said backup ring facing generally radially inward toward and establishing a region of clearance and a journal bearing relationship with said sealing surface, and said sealing surface locating said backup ring laterally;
a ring outer surface of said backup ring facing generally radially outward and located in axially intermediate relation to said outer first ring end and said second ring end and located radially outward of and encircling at least a portion of said ring inner surface, said ring inner surface and said ring outer surface being exposed to said second fluid pressure;
a pressure-retaining seal located at least partially within said gland bore of said backup ring, said pressure-retaining seal being in sealing contact with said gland bore and with said sealing surface of said shaft element and partitioning said first fluid pressure from said second fluid pressure;
a ring first end seal contacting and providing sealing between said ring retainer and said backup ring, partitioning said first fluid and said first fluid pressure from said second fluid and said second fluid pressure, and preventing said first fluid from escaping between said retaining shoulder and said outer first ring end and into said second fluid, said ring first end seal being located radially farther than said pressure-retaining seal from said sealing surface and encircling said sealing surface;
said pressure-retaining seal and said ring first end seal defining a first hydraulic area exposed to said first fluid pressure, said first fluid pressure acting over said first hydraulic area and producing an axially oriented first hydraulic force acting on said backup ring in a first hydraulic force direction generally toward said locating shoulder of said bulkhead housing;
inner and outer balancing seals exposed to and located between said first and second fluids and contacting and providing sealing between said backup ring and said bulkhead housing, partitioning said first fluid and said first fluid pressure from said second fluid and said second fluid pressure, and preventing said first fluid from escaping between said second ring end and said locating shoulder and into said second fluid;
a portion of said bulkhead housing radially inward of said inner balancing seal exposed to said second fluid and said second fluid pressure, a portion of said bulkhead housing radially outward of said inner balancing seal and radially inward of said outer balancing seal exposed to said first fluid and said first fluid pressure; and
said inner and outer balancing seals defining a second hydraulic area exposed to said first fluid pressure, said first fluid pressure acting over said second hydraulic area and producing an axially oriented second hydraulic force acting on said backup ring in a second hydraulic force direction generally toward said retaining shoulder of said ring retainer.

2. The sealing assembly of claim 1, wherein an intersection between said inner first ring end and said ring inner surface of said backup ring forms an extrusion gap corner, said outer first ring end being separated from said second ring end by an axial distance, and said extrusion gap corner being separated from said second ring end by an axial distance, said axial distance separating said extrusion gap corner from said second ring end being less than said axial distance separating said outer first ring end from said second ring end and said extrusion gap corner being located in intermediate relation to said outer first ring end and second ring end, said extrusion gap corner being an external corner, said ring inner surface being located in intermediate relation to said inner first ring end and said second ring end.

3. The sealing assembly of claim 1, wherein an intersection between said inner first ring end and said gland bore of said backup ring forms a gland inside corner, said outer first ring end being separated from said second ring end by an axial distance, and said gland inside corner being separated from said second ring end by an axial distance, said axial distance separating said gland inside corner from said second ring end being less than said axial distance separating said outer first ring end from said second ring end and said gland inside corner being located in axially intermediate relation to said outer first ring end and said second ring end.

4. The sealing assembly of claim 1, wherein said pressure-retaining seal has first and second seal ends, said first seal end facing generally away from said inner first ring end, and said second end facing generally toward and adjoining said inner first ring end, and said outer first ring end is located in intermediate relation to said first and second seal ends, and said outer first ring end encircling at least a portion of said gland bore and encircling at least a portion of said sealing surface of said shaft element.

5. The sealing assembly of claim 1, wherein a seal carrier of generally annular form is located radially outward of and encircles a portion of said sealing surface of said shaft element and is located at least partially within a carrier recess bore of said ring retainer and is retained within said carrier recess bore by a carrier retainer, and said seal carrier forms a seal groove locating a partitioning seal in sealing engagement with said sealing surface of said shaft element;
   said partitioning seal separating said first fluid from a fluid media having a fluid media pressure,
   a carrier seal located between said first fluid and said fluid media and contacting and providing sealing between said seal carrier and said carrier retainer;
   an annular radially inwardly projecting portion of said ring retainer being located axially between said backup ring and at least a portion of said seal carrier, no portion of said carrier retainer being located axially between said backup ring and said seal carrier; and
   said bulkhead housing, said ring retainer and said carrier retainer are threadedly retained together.

6. The sealing assembly of claim 5, wherein an axially movable piston is located at least partially within a housing bore of a machine housing, a portion of said housing bore and a portion of said piston being exposed to said fluid media and a portion of said housing bore and a portion of said piston being exposed to said first fluid, a sliding seal located between and exposed to said fluid media and said first fluid and held in sealing contact with said housing bore and said piston, said piston separating said first fluid from said fluid media, and said fluid media pressure acting in a generally axial direction on said piston, producing said first fluid pressure, said first fluid pressure being communicated to and between said seal carrier and said backup ring, said sealing surface of said shaft element passing completely through said backup ring and locating said seal carrier laterally.

7. The sealing assembly of claim 1, wherein a fluid communication passageway formed in said backup ring has a first open end facing in a generally axial direction away from said second ring end, and has a second open end facing in a generally axial direction away from said outer first ring end, said first open end being located in radially intermediate relation to said pressure-retaining seal and said ring first end seal, and said second open end being located in radially intermediate relation to said inner and outer balancing seals, said fluid communication passageway communicating said first fluid pressure through said backup ring from said outer first ring end to said second ring end, and to said second hydraulic area said fluid communication passageway being located radially inward from said ring outer surface of said backup ring.

8. The sealing assembly of claim 1, wherein a generally conical seal installation chamfer forms an external corner with said gland bore of said backup ring, all of said generally conical seal installation chamfer being located radially more distant than said gland bore from said sealing surface of said shaft element.

9. The sealing assembly of claim 1, wherein said gland bore has first and second axial extremities, and said retaining shoulder and said outer first ring end are located axially in intermediate location to said first and second axial extremities of said gland bore and encircle at least a portion of said gland bore and encircle at least a portion of said sealing surface of said shaft element.

10. A sealing assembly comprising:
   a bulkhead housing of annular form having a locating shoulder facing in a generally axial direction;
   a first fluid having a first fluid pressure and a second fluid having a second fluid pressure;
   a shaft element being relatively movable with respect to said bulkhead housing and defining an externally oriented sealing surface of generally cylindrical form;
   a ring retainer of annular form located radially outward of and encircling at least a portion of said sealing surface of said shaft element, said ring retainer defining a retaining shoulder facing generally toward said locating shoulder of said bulkhead housing and separated from said locating shoulder by an axial dimension, said ring retainer having a radially inward facing surface forming an annular receiving recess located in radially spaced relation to said sealing surface and encircling at least part of said sealing surface, said locating shoulder of said bulkhead housing facing generally toward said retaining shoulder;
   a backup ring of generally circular form located axially by said retaining shoulder and said locating shoulder, and having an outer first ring end with at least a portion thereof facing and adjoining said retaining shoulder and having a second ring end having at least a portion thereof facing and adjoining said locating shoulder, said outer first ring end and said second ring end facing in generally opposite directions, said backup ring having a ring inner surface that is larger than, and facing generally radially inward toward, said sealing surface and establishing an extrusion gap clearance and a bearing relationship therewith locating said backup ring radially, said backup ring having a ring outer surface facing generally radially outward and located in axially intermediate relation to said retaining shoulder and said locating shoulder, said outer first ring end located radially outward of and encircling at least a portion of said sealing surface, at least part of said sealing surface being located within said ring inner surface;
   an annular extension protruding axially from said backup ring at a radially intermediate location to said outer first ring end and said ring inner surface, a surface of said annular extension forming at least part of a gland bore facing radially inward toward, encircling, and separated radially from said sealing surface, at least a portion of said annular extension being located within and encircled by said annular receiving recess of said ring retainer and at least part of said annular extension being located within and encircled by said retaining shoulder;
   an inner first ring end of said backup ring being located in radially intermediate relation to said annular extension and said sealing surface and being located radially outward of and encircling a portion of said sealing surface;

said annular extension being located radially in intermediate location to said inner first ring end and said outer first ring end;

a pressure-retaining seal of annular form located at least partially within said gland bore and having sealing contact with said backup ring and with said sealing surface of said shaft element and partitioning said first fluid from said second fluid;

a ring first end seal contacting and providing sealing between said ring retainer and said backup ring, partitioning said first fluid and said first fluid pressure from said second fluid and said second fluid pressure, and preventing said first fluid from escaping between said retaining shoulder and said outer first ring end and into said second fluid, said ring first end seal being located radially farther than said pressure retaining seal from said sealing surface and being located radially outward from and encircling said sealing surface and being located radially outward from said pressure-retaining seal;

said pressure-retaining seal and said ring first end seal defining a first hydraulic area exposed to said first fluid pressure, said first fluid pressure acting over said first hydraulic area and producing an axially oriented first hydraulic force acting on said backup ring in a first hydraulic force direction generally toward said locating shoulder of said bulkhead housing;

inner and outer balancing seals exposed to and located between said first and second fluids and contacting and providing sealing between said backup ring and said bulkhead housing, partitioning said first fluid and said first fluid pressure from said second fluid and said second fluid pressure, and preventing said first fluid from escaping between said second ring end and said locating shoulder and into said second fluid;

a portion of said bulkhead housing radially inward of said inner balancing seal exposed to said second fluid and said second fluid pressure, a portion of said bulkhead housing radially outward of said inner balancing seal and radially inward of said outer balancing seal exposed to said first fluid and said first fluid pressure; and said inner and outer balancing seals defining a second hydraulic area exposed to said first fluid pressure, said first fluid pressure acting over said second hydraulic area and producing a second axially oriented hydraulic force acting on said backup ring in a second hydraulic force direction generally toward said retaining shoulder of said ring retainer.

11. The sealing assembly of claim 10, wherein an intersection between said inner first ring end and said ring inner surface of said backup ring forms an extrusion gap corner, said outer first ring end being separated from said second ring end by an axial distance, and said extrusion gap corner being separated from said second ring end by an axial distance, said axial distance separating said extrusion gap corner from said second ring end being less than said axial distance separating said outer first ring end and said second ring end and said extrusion gap corner being located in intermediate relation to said outer first ring end and said second ring end, said extrusion gap corner being an external corner; and an intersection between said inner first ring end and said gland bore forms a gland inside corner, said gland inside corner being separated from said second ring end by an axial distance, said axial distance separating said gland inside corner from said second ring end being less than said axial distance separating said outer first ring end and said second ring end and said gland inside corner being located in intermediate relation to said outer first ring end and said second ring end, said inner first ring end facing away from said second ring end and facing away from said locating shoulder of said bulkhead housing.

12. The sealing assembly of claim 10, wherein a fluid communication passageway formed in said backup ring has a first open end facing in a generally axial direction away from said second ring end, and has a second open end facing in a generally axial direction away from said outer first ring end, said first open end being located in radially intermediate relation to said pressure-retaining seal and said ring first end seal, and said second open end being located in radially intermediate relation to said inner and outer balancing seals, said fluid communication passageway communicating said first fluid pressure through said backup ring from said outer first ring end to said second ring end, and providing said first fluid pressure to said second hydraulic area, at least part of said fluid communication passageway being encircled by said ring outer surface of said backup ring.

13. The sealing assembly of claim 10, wherein a generally conical seal installation chamfer adjoins and forms an external corner with said gland bore of said backup ring, all of said generally conical seal installation chamfer being located radially more distant than said gland bore from said externally oriented sealing surface of said shaft element, and said gland bore is located in intermediate location to said seal installation chamfer and said inner first ring end.

14. The sealing assembly of claim 10, wherein said gland bore has first and second axial extremities, and said retaining shoulder and said outer first ring end are located axially in intermediate location to said first and second axial extremities of said gland bore, at least part of said inner first ring end being located in axially intermediate location to said outer first ring end and said second ring end, said inner first ring end facing in a generally axial direction away from said second ring end, said outer first ring end encircling at least a portion of said gland bore.

15. A sealing assembly comprising:

a bulkhead housing of annular form having a locating shoulder facing in a generally axial direction and having a shaft passageway of annular form and facing generally radially inward, said shaft passageway being the innermost surface of said bulkhead housing;

a ring retainer of annular form having a retaining shoulder facing in a generally axial direction toward said locating shoulder of said bulkhead housing;

a backup ring of generally circular form, at least a portion of said backup ring located between said retaining shoulder of said ring retainer and said locating shoulder of said bulkhead housing, said backup ring having an outer first ring end with at least a portion thereof facing and adjoining said retaining shoulder and facing in a generally axial direction away from said locating shoulder, and having an inner first ring end facing in a generally axial direction away from said locating shoulder, and having a second ring end with at least a portion thereof facing and adjoining said locating shoulder, said outer first ring end and said second ring end facing in generally opposite directions, and said inner first ring end and said second ring end facing in generally opposite directions;

an annular extension protruding axially from said backup ring at radially intermediate location to said outer first ring end and said inner first ring end and forming at least a portion of a generally radially inwardly facing gland bore, said backup ring having a ring inner surface facing generally inward, and having a ring outer surface facing generally radially outward and located in axially intermediate location to said outer first ring end and said second ring end;

a shaft element having an externally oriented sealing surface of generally cylindrical form that is smaller than said ring inner surface, at least part of said sealing surface being located within and encircled by said annular extension of said backup ring, at least part of said sealing surface being located within and encircled by said ring inner surface of said backup ring and establishing a region of clearance therewith, at least part of said shaft element being located within and encircled by said shaft passageway of said bulkhead housing;

an intersection between said inner first ring end and said ring inner surface of said backup ring forming an extrusion gap corner, said outer first ring end being separated from said second ring end by an axial distance, and said extrusion gap corner being separated from said second ring end by an axial distance, said axial distance separating said extrusion gap corner from said second ring end being less than said axial distance separating said outer first ring end from said second ring end, and said extrusion gap corner being an external corner and being located in intermediate relation to said outer first ring end and said second ring end;

a pressure-retaining seal located at least partially within said gland bore of said backup ring and in sealing contact with said backup ring and with said sealing surface of said shaft element and partitioning a first fluid having a first fluid pressure from a second fluid having a second fluid pressure, at least a portion of said gland bore encircling a part of said sealing surface;

inner and outer balancing seals located radially outward of and encircling said shaft element and contacting said bulkhead housing and said backup ring and preventing the escape of said first fluid between said locating shoulder and said second ring end and into said second fluid; and a ring first end seal contacting and providing sealing between said ring retainer and said backup ring, partitioning said first fluid and said first fluid pressure from said second fluid and said second fluid pressure, and preventing said first fluid from escaping between said retaining shoulder and said outer first ring end and into said second fluid, said ring first end seal being located radially outward from and encircling at least part of said gland bore and being located radially outward from and encircling at least part of said pressure-retaining seal.

16. The sealing assembly of claim 15, wherein an intersection between said inner first ring end and said gland bore of said backup ring forms a gland inside corner, said outer first ring end being separated from said second ring end by an axial distance, and said gland inside corner being separated from said second ring end by an axial distance, said axial distance separating said gland inside corner from said second ring end being less than said axial distance separating said outer first ring end from said second ring end, and said gland inside corner being located in axially intermediate relation to said outer first ring end and second ring end, said outer first ring end being located radially outward of and encircling said gland bore.

17. The sealing assembly of claim 15, wherein a fluid communication passageway is formed in said backup ring and has a first open end facing in a generally axial direction away from said second ring end, and has a second open end facing in a generally axial direction away from said outer first ring end and toward said bulkhead housing, said first open end being located in radially intermediate relation to said pressure-retaining seal and said ring first end seal, and said second open end being located in radially intermediate relation to said inner and outer balancing seals, said fluid communication passageway communicating said first fluid pressure through said backup ring from said outer first ring end to said second ring end, at least part of said fluid communication passageway being located radially between said ring inner surface and said ring outer surface.

18. The sealing assembly of claim 15, wherein said annular extension incorporates a generally conical seal installation chamfer, said gland bore of said backup ring being located in axially intermediate location to said seal installation chamfer and said inner first ring end, all of said seal installation chamfer being located farther than said gland bore from said sealing surface of said shaft element.

19. The sealing assembly of claim 15, wherein said gland bore has first and second axial extremities, and said retaining shoulder and said outer first ring end are located axially in intermediate location to said first and second axial extremities of said gland bore, said sealing surface of said shaft element locating said backup ring laterally, said retaining shoulder and said outer first ring end being located radially outward of and encircling said sealing surface.

20. The sealing assembly of claim 15, wherein a seal carrier of generally annular form is located radially outward of and encircles a portion of said sealing surface of said shaft element, is located at least partially within a carrier recess bore of said ring retainer, is retained within said carrier recess bore by a carrier retainer, and forms a seal groove locating a partitioning seal in sealing engagement with said sealing surface of said shaft element;

said partitioning seal separating said first fluid from a fluid media having a fluid media pressure, a carrier seal located between said first fluid and said fluid media and contacting and providing sealing between said seal carrier and said carrier retainer;

said sealing surface of said shaft element locating said seal carrier and said backup ring laterally, no portion of said carrier retainer being located axially between said seal carrier and said backup ring and no portion of said carrier retainer being located axially between said seal carrier and said ring retainer, and no portion of said carrier retainer being located axially between said seal carrier and said bulkhead housing; and said bulkhead housing, said ring retainer and said carrier retainer are threadedly retained together.

21. The sealing assembly of claim 15, wherein all of said backup ring is larger than said sealing surface of said shaft element and said sealing surface passes completely through said backup ring and locates said backup ring laterally, said inner and outer balancing seals being located radially outward of, radially spaced from, and encircling said sealing surface, a portion of said sealing surface being located directly radially inward of and surrounded by said retaining shoulder, said retaining shoulder encircling said portion of said sealing surface, no portion of said backup ring extending axially beyond said sealing surface.

22. The sealing assembly of claim 15, wherein said bulkhead housing having a ring pocket bore located radially outward of, radially spaced from, having radial clearance with, and encircling at least a portion of said ring outer surface of said backup ring, at least a portion of said backup ring being located radially between said ring pocket bore and said sealing surface, no portion of said ring retainer being located axially between said backup ring and said bulkhead housing.

23. The sealing assembly of claim 15, wherein said ring inner surface being located in intermediate relation to said inner first ring end and said second ring end and no portion of said ring inner surface is exposed to said first fluid pressure, a portion of said second ring end being located radially inward of said inner balancing seal and exposed to said second fluid pressure, a portion of said second ring end being located radially outward of said outer balancing seal and exposed to said second fluid pressure, an annular portion of said second ring end located radially between said inner and outer balancing seals being exposed to said first fluid and said first fluid pressure, a portion of said outer first ring end being located radially outward of said ring first end seal being exposed to said second fluid pressure, said inner and outer balancing seals being closer than said ring first end seal to said bulkhead housing.

24. The sealing assembly of claim 15, wherein said ring inner surface establishing a bearing relationship with said sealing surface of said shaft element, said ring inner surface being located in intermediate relation to said inner first ring end and said second ring end, no portion of said ring retainer being located axially between said second ring end and said locating shoulder of said bulkhead housing, all of said outer first ring end being larger than and located radially outward from said inner first ring end.

\* \* \* \* \*